US012706040B2

(12) United States Patent
Qing

(10) Patent No.: US 12,706,040 B2
(45) Date of Patent: Aug. 11, 2026

(54) PIXEL DRIVING CIRCUIT, DRIVING METHOD FOR THE PIXEL DRIVING CIRCUIT, AND DISPLAY PANEL

(71) Applicants: Beijing BOE Technology Development Co., Ltd., Beijing (CN); Chengdu BOE Optoelectronics Technology Co., Ltd., Sichuan (CN)

(72) Inventor: Haigang Qing, Beijing (CN)

(73) Assignees: BEIJING BOE TECHNOLOGY DEVELOPMENT CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/929,677

(22) Filed: Oct. 29, 2024

(65) Prior Publication Data

US 2025/0054447 A1 Feb. 13, 2025

Related U.S. Application Data

(63) Continuation of application No. 17/796,308, filed as application No. PCT/CN2021/102363 on Jun. 25, 2021, now Pat. No. 12,170,060.

(51) Int. Cl.
*G09G 3/3233* (2016.01)

(52) U.S. Cl.
CPC ... *G09G 3/3233* (2013.01); *G09G 2300/0426* (2013.01); *G09G 2300/0852* (2013.01); *G09G 2310/061* (2013.01)

(58) Field of Classification Search
CPC ......... G09G 3/3233; G09G 2300/0426; H10K 59/131; H10K 59/12
See application file for complete search history.

(56) References Cited

U.S. PATENT DOCUMENTS

| | | | |
|---|---|---|---|
| 9,685,113 | B2 | 6/2017 | Chen |
| 10,032,412 | B2 | 7/2018 | Zhu |

(Continued)

FOREIGN PATENT DOCUMENTS

| | | | |
|---|---|---|---|
| CN | 103354077 | A | 10/2013 |
| CN | 107452334 | A | 12/2017 |

(Continued)

OTHER PUBLICATIONS

First Office Action of JP application No. 2023-534028 dated May 7, 2025.

(Continued)

*Primary Examiner* — Koosha Sharifi-Tafreshi
(74) *Attorney, Agent, or Firm* — Calfee, Halter & Griswold LLP

(57) ABSTRACT

A display panel is disclosed. The display panel includes a base substrate; and an active layer arranged on a side of the base substrate. The active layer includes: a sixth active portion, a seventh active portion, a tenth active portion and a second initialization signal line, the second initialization signal line is connected to an end of the seventh active portion away from the sixth active portion, the second initialization signal line is used for providing an initialization signal to a seventh transistor, the seventh transistor comprises the seventh active portion, and the second initialization signal line extends along a first direction.

9 Claims, 20 Drawing Sheets

(56) References Cited

U.S. PATENT DOCUMENTS

| | | | | |
|---|---|---|---|---|
| 11,532,266 | B2 * | 12/2022 | Park | H10K 59/121 |
| 2021/0202633 | A1 * | 7/2021 | Song | G09G 5/00 |
| 2021/0312865 | A1 * | 10/2021 | Cha | G09G 3/3258 |
| 2022/0375399 | A1 * | 11/2022 | Park | H10K 59/121 |

FOREIGN PATENT DOCUMENTS

| | | | |
|---|---|---|---|
| CN | 107591124 | B | 10/2019 |
| CN | 111179854 | A | 5/2020 |
| JP | 2020524305 | A | 8/2020 |

OTHER PUBLICATIONS

First Office Action of CN application No. 202180001638.5 dated Jul. 24, 2025.

Second Office Action of JP application No. 2023-534028 dated Oct. 28, 2025.

First Office Action of IN application No. 202317088816 dated Apr. 22, 2026.

* cited by examiner

PIXEL DRIVING CIRCUIT, DRIVING METHOD FOR THE PIXEL DRIVING CIRCUIT, AND DISPLAY PANEL

CROSS REFERENCE TO RELATED DOCUMENT(S)

The present application is a continuation of U.S. application Ser. No. 17/796,308, which is a U.S. national stage of International Application No. PCT/CN2021/102363, filed on Jun. 25, 2021, and the entire contents thereof are incorporated herein by reference.

TECHNICAL FIELD

Embodiments of the present disclosure generally relate to the display technical field, and more particularly, to a pixel driving circuit, a driving method for the pixel driving circuit, and a display panel.

BACKGROUND

In a display panel, a driving current is provided to a light-emitting unit by a pixel driving circuit to drive the light-emitting unit to emit light. In the related art, the driving current output by the pixel driving circuit is related to the voltage of a power supply line. However, the power supply lines at different positions in the display panel have different voltage drops, resulting in uneven display effect of the display panel.

It should be noted that the information disclosed in the Background section is only for enhancing understanding of the background of the present disclosure, and therefore may include information that does not form the prior art known to a person of ordinary skill in the art.

SUMMARY

According to an aspect of the present disclosure, there is provided a pixel driving circuit, including a driving circuit, a control circuit, a voltage stabilization circuit and a first storage circuit.

The driving circuit is connected to a first node, a second node and a third node and is configured to provide a driving current to the third node through the second node according to a signal from the first node;

the control circuit is connected to a first enable signal terminal, the second node, a first power supply terminal and a fourth node and is configured to create conduction between the second node and the fourth node in response to a signal from the first enable signal terminal, and create conduction between the first power supply terminal and the fourth node in response to the signal from the first enable signal terminal;

the voltage stabilization circuit is connected to the fourth node, a second enable signal terminal and a reference voltage terminal and is configured to transmit a signal from the reference voltage terminal to the fourth node in response to a signal from the second enable signal terminal; and the first storage circuit is connected between the first node and the fourth node and is configured to store the electric charges of the first node and the fourth node.

In an example embodiment of the present disclosure, a polarity of the signal from the first enable signal terminal is opposite to a polarity of the signal from the second enable signal terminal.

In an example embodiment of the present disclosure, the control circuit is further connected to the third node, a fifth node and the first enable signal terminal, and the control circuit is further configured to create conduction between the third node and the fifth node in response to the signal from the first enable signal terminal;

wherein the pixel driving circuit further includes:

a first reset circuit connected to an initialization signal terminal and the fifth node, and configured to transmit a signal from the initialization signal terminal to the fifth node in response to at least one control signal.

In an example embodiment of the present disclosure, the first reset circuit is further connected to the second enable signal terminal, and the first reset circuit is configured to transmit the signal from the initialization signal terminal to the fifth node in response to the signal from the second enable signal terminal.

In an example embodiment of the present disclosure, the driving circuit includes a driving transistor, wherein a first electrode of the driving transistor is connected to the second node, a second electrode of the driving transistor is connected to the third node, and a gate electrode of the driving transistor is connected to the first node.

The control circuit includes:

a fifth transistor, wherein a first electrode of the fifth transistor is connected to the second node, a second electrode of the fifth transistor is connected to the fourth node, and a gate electrode of the fifth transistor is connected to the first enable signal terminal;

an eighth transistor, wherein a first electrode of the eighth transistor is connected to the fourth node, a second electrode of the eighth transistor is connected to the first power supply terminal, and a gate electrode of the eighth transistor is connected to the first enable signal terminal; and a sixth transistor, wherein a first electrode of the sixth transistor is connected to the fifth node, a second electrode of the sixth transistor is connected to the third node, and a gate electrode of the sixth transistor is connected to the first enable signal terminal.

The voltage stabilization circuit includes a third transistor, wherein a first electrode of the third transistor is connected to the reference voltage terminal, a second electrode of the third transistor is connected to the fourth node, and a gate electrode of the third transistor is connected to the second enable signal terminal;

The first storage circuit includes a first capacitor connected between the first node and the fourth node.

The first reset circuit includes a seventh transistor, wherein a first electrode of the seventh transistor is connected to the initialization signal terminal, a second electrode of the seventh transistor is connected to the fifth node, and a gate electrode of the seventh transistor is connected to the second enable signal terminal.

In an example embodiment of the present disclosure, the pixel driving circuit further includes:

a data writing circuit connected to the second node and a data signal terminal and configured to transmit a signal from the data signal terminal to the second node in response to at least one control signal; and a compensation circuit connected to the third node and the first node and configured to create conduction between the first node and the third node in response to at least one control signal.

In an example embodiment of the present disclosure, the data writing circuit is further connected to a first gate driving signal terminal, and the data writing circuit is configured to transmit a signal from the data signal terminal to the second node in response to a signal from the first gate driving signal terminal; and the compensation circuit is further connected to the first gate driving signal terminal, and the compensation circuit is configured to create conduction between the first node and the third node in response to the signal from the first gate driving signal terminal.

In an example embodiment of the present disclosure, the data writing circuit is further connected to the second enable signal terminal, and the data writing circuit is configured to transmit the signal from the data signal terminal to the second node in response to the signal from the second enable signal terminal; and the compensation circuit is further connected to the second enable signal terminal, and the compensation circuit is configured to create conduction between the first node and the third node in response to the signal from the second enable signal terminal.

In an example embodiment of the present disclosure, the pixel driving circuit further includes:

a second reset circuit connected to the first node, an initialization signal terminal and a reset signal terminal, and configured to transmit a signal from the initialization signal terminal to the first node in response to a signal from the reset signal terminal.

In an example embodiment of the present disclosure, the data writing circuit includes a fourth transistor, wherein a first electrode of the fourth transistor is connected to the data signal terminal, a second electrode of the fourth transistor is connected to the second node, and a gate electrode of the fourth transistor is connected to the first gate driving signal terminal.

The compensation circuit includes a second transistor, wherein a first electrode of the second transistor is connected to the first node, a second electrode of the second transistor is connected to the third node, and a gate electrode of the second transistor is connected to the first gate driving signal terminal.

The second reset circuit includes a first transistor, wherein a first electrode of the first transistor is connected to the initialization signal terminal, a second electrode of the first transistor is connected to the first node, and a gate electrode of the first transistor is connected to the reset signal terminal.

In an example embodiment of the present disclosure, the pixel driving circuit further includes:

a second storage circuit connected between the second node and the fourth node, and configured to store electric charges of the second node and the fourth node;

wherein the data writing circuit is further connected to the first gate driving signal terminal, and the data writing circuit is configured to transmit the signal from the data signal terminal to the second node in response to a signal from the first gate driving signal terminal;

wherein the compensation circuit is further connected to a second gate driving signal terminal, and the compensation circuit is configured to create conduction between the first node and the third node in response to a signal from the second gate driving signal terminal.

In an example embodiment of the present disclosure, the pixel driving circuit further includes:

a second reset circuit connected to the first node and an initialization signal terminal, and configured to transmit a signal from the initialization signal terminal to the first node in response to at least one control signal.

In an example embodiment of the present disclosure, the second reset circuit is further connected to a reset signal terminal, the first gate driving signal terminal and a sixth node, and configured to create conduction between the initialization signal terminal and the sixth node in response to a signal from the reset signal terminal and configured to create conduction between the sixth node and the first node in response to the signal from the first gate driving signal terminal.

In an example embodiment of the present disclosure, the data writing circuit includes a fourth transistor, wherein a first electrode of the fourth transistor is connected to the data signal terminal, a second electrode of the fourth transistor is connected to the second node, and a gate electrode of the fourth transistor is connected to the first gate driving signal terminal;

the compensation circuit includes a second transistor, wherein a first electrode of the second transistor is connected to the first node, a second electrode of the second transistor is connected to the third node, and a gate electrode of the second transistor is connected to the second gate driving signal terminal;

the second reset circuit includes:

a first transistor, wherein a first electrode of the first transistor is connected to the initialization signal terminal, a second electrode of the first transistor is connected to the sixth node, and a gate electrode of the first transistor is connected to the reset signal terminal; and a ninth transistor, wherein a first electrode of the ninth transistor is connected to the sixth node, a second electrode of the ninth transistor is connected to the first node, and a gate electrode of the ninth transistor is connected to the first gate driving signal terminal;

the second storage circuit includes a second capacitor connected between the second node and the fourth node.

According to an aspect of the present disclosure, there is provided a driving method for a pixel driving circuit, the method being configured to drive the pixel driving circuit described above, wherein the driving method includes:

at least in a threshold compensation stage, inputting an inactive level to the first enable signal terminal, and inputting an active level to the second enable signal terminal; and in a light-emitting stage, inputting the active level to the first enable signal terminal, and inputting the inactive level to the second enable signal terminal.

According to another aspect of the present disclosure, there is provided a driving method for a pixel driving circuit, the method being configured to drive the pixel driving circuit described above, wherein the driving method includes:

in a reset stage, inputting an active level to the reset signal terminal and the second enable signal terminal, and inputting an inactive level to the first gate driving signal terminal and the first enable signal terminal;

in a threshold compensation stage, inputting the active level to the first gate driving signal terminal and the second enable signal terminal, and inputting the inactive level to the reset signal terminal and the first enable signal terminal; and in a light-emitting stage, inputting the active level to the first enable signal terminal, and inputting the inactive level to the first gate driving signal terminal, the reset signal terminal, and the second enable signal terminal.

According to another aspect of the present disclosure, there is provided a driving method for a pixel driving circuit, the method being configured to drive the pixel driving circuit described above, wherein the driving method includes:

in a first reset stage, inputting an active level to the reset signal terminal and the second enable signal terminal, and inputting an inactive level to the first gate driving signal terminal, the first enable signal terminal, and the second gate driving signal terminal;

in a second reset stage, inputting the active level to the reset signal terminal, the second enable signal terminal, and the first gate driving signal terminal, and inputting the inactive level to the first enable signal terminal and the second gate driving signal terminal;

in a first threshold compensation stage, inputting the active level to the first gate driving signal terminal, the second enable signal terminal and the second gate driving signal terminal, and inputting the inactive level to the reset signal terminal and the first enable signal terminal;

in a second threshold compensation stage, inputting the active level to the second enable signal terminal and the second gate driving signal terminal, and inputting the inactive level to the first gate driving signal terminal, the reset signal terminal and the first enable signal terminal; and in a light-emitting stage, inputting the active level to the first enable signal terminal, and inputting the inactive level to the first gate driving signal terminal, the second gate driving signal terminal, the reset signal terminal and the second enable signal terminal.

According to another aspect of the present disclosure, there is provided a display panel, including the pixel driving circuit described above.

According to another aspect of the present disclosure, there is provided a display panel, including a pixel driving circuit, wherein the pixel driving circuit includes:

a driving transistor;

a fifth transistor, wherein a first electrode of the fifth transistor is connected to a first electrode of the driving transistor, and a gate electrode of the fifth transistor is connected to a first enable signal line;

an eighth transistor, wherein a first electrode of the eighth transistor is connected to a second electrode of the fifth transistor, a second electrode of the eighth transistor is connected to a power supply line, and a gate electrode of the eighth transistor is connected to the first enable signal line;

a third transistor, wherein a first electrode of the third transistor is connected to a reference voltage line, a second electrode of the third transistor is connected to the second electrode of the fifth transistor, and a gate electrode of the third transistor is connected to a second enable signal line; and a first capacitor connected between a gate electrode and the first electrode of the driving transistor.

In an example embodiment of the present disclosure, the display panel further includes: a base substrate, an active layer, a first conductive layer, a second conductive layer, and a third conductive layer.

The active layer is arranged on a side of the base substrate. The active layer includes: a tenth active portion, a third active portion, a fifth active portion, an eighth active portion and an eleventh active portion part, the eleventh active portion is connected to the third active portion, the fifth active portion and the eighth active portion, and the tenth active portion is connected to an end of the fifth active portion away from the eleventh active portion.

The tenth active portion is used to form a channel region of the driving transistor, the third active portion is used to form a channel region of the third transistor, the fifth active portion is used to form a channel region of the fifth transistor, and the eighth active portion is used to form a channel region of the eighth transistor.

The first conductive layer is arranged on a side of the active layer away from the base substrate. The first conductive layer includes: the tenth conductive portion, the first enable signal line, the eighth conductive portion, and the second enable signal line.

An orthographic projection of the tenth conductive portion on the base substrate covers an orthographic projection of the tenth active portion on the base substrate, and the tenth conductive portion is used to form the gate electrode of the driving transistor and a first electrode of the first capacitor.

An orthographic projection of the first enable signal line on the base substrate extends along a first direction, and the orthographic projection of the first enable signal line on the base substrate covers an orthographic projection of the fifth active portion on the base substrate, and a partial structure of the first enable signal line is used to form the gate electrode of the fifth transistor.

An orthographic projection of the second enable signal line on the base substrate extends along the first direction, and the orthographic projection of the second enable signal line on the base substrate covers an orthographic projection of the third active portion on the base substrate, and a partial structure of the second enable signal line is used to form the gate electrode of the third transistor.

The eighth conductive portion is connected to the first enable signal line, an orthographic projection of the eighth conductive portion on the base substrate covers an orthographic projection of the eighth active portion on the base substrate, and the eighth conductive portion is used to form the gate electrode of the eighth transistor.

The second conductive layer is arranged on a side of the first conductive layer away from the base substrate, wherein the second conductive layer includes an eleventh conductive portion, an orthographic projection of the eleventh conductive portion on the base substrate at least partially overlaps with an orthographic projection of the tenth conductive portion on the base substrate, and the eleventh conductive portion is used to form a second electrode of the first capacitor.

The third conductive layer is arranged on a side of the second conductive layer away from the base substrate, wherein the third conductive layer includes a first connection portion, and the first connection portion is connected to the eleventh active portion and the eleventh conductive portion through vias.

In an example embodiment of the present disclosure, the active layer further includes:

a twelfth active portion connected to an end of the eighth active portion away from the eleventh active portion;

a thirteenth active portion connected to an end of the third active portion away from the eleventh active portion;

wherein the third conductive layer further includes the reference voltage line, an orthographic projection of the reference voltage line on the base substrate extends along the first direction, and the reference voltage line is connected to the thirteenth active portion through a via;

wherein the display panel further includes a fourth conductive layer arranged on a side of the third conductive layer away from the base substrate, the fourth conductive layer includes the power supply line, an orthographic projection of the power supply line on the base substrate extends along a second direction, the first direction and the second direction intersect with each other, and the power supply line is connected to the twelfth active portion through a via.

In an example embodiment of the present disclosure, the pixel driving circuit further includes a second transistor and a fourth transistor;

wherein a first electrode of the second transistor is connected to the gate electrode of the driving transistor, a second electrode of the second transistor is connected to the second electrode of the driving transistor, and a gate electrode of the second transistor is connected to a first gate line;

wherein a first electrode of the fourth transistor is connected to a data line, a second electrode of the fourth transistor is connected to the first electrode of the driving transistor, and a gate electrode of the fourth transistor is connected to the first gate line;

wherein there are a plurality of pixel driving circuits, and the plurality of the pixel driving circuits include a first pixel driving circuit and a second pixel driving circuits which are apart in the first direction;

wherein the first conductive layer further includes a fourth conductive portion, a partial structure of the fourth conductive portion is used to form the gate electrode of the second transistor in the first pixel driving circuit, and another partial structure of the fourth conductive portion is used to form the gate electrode of the fourth transistor in the second pixel driving circuit;

wherein there are a plurality of fourth conductive portions, and orthographic projections of the plurality of the fourth conductive portions on the base substrate are apart in the first direction;

wherein the third conductive layer further includes the first gate line, an orthographic projection of the first gate line on the base substrate extends along the first direction, and the first gate line is connected to the plurality of fourth conductive portions which are apart in the first direction;

wherein a sheet resistance of the third conductive layer is smaller than a sheet resistance of the first conductive layer.

In an example embodiment of the present disclosure, the pixel driving circuit further includes a fourth transistor, a first electrode of the fourth transistor is connected to a data line, and a second electrode of the fourth transistor is connected to the first electrode of the driving transistor;

wherein the active layer further includes a second active portion and a fourteenth active portion, the second active portion is used to form the channel region of the second transistor, and the fourteenth active portion is connected to the second active portion and is also connected to the tenth conductive portion;

wherein the second conductive layer further includes a twelfth conductive portion connected to the eleventh conductive portion, an orthographic projection of the twelfth conductive portion on the base substrate extends along the second direction, and the orthographic projection of the twelfth conductive portion on the base substrate is at least partially between the orthographic projection of the fourteenth active portion on the base substrate and an orthographic projection of the data line on the base substrate.

In an example embodiment of the present disclosure, there are a plurality of pixel driving circuits, and the plurality of pixel driving circuits include a first pixel driving circuit and a second pixel driving circuit which are apart in the first direction;

wherein the first conductive layer further includes a fourth conductive portion, a partial structure of the fourth conductive portion is used to form a gate electrode of the second transistor in the first pixel driving circuit, and another partial the structure of the fourth conductive portion is used to form the gate electrode of the fourth transistor in the second driving circuit;

wherein there are a plurality of fourth conductive portions, and orthographic projections of the plurality of the fourth conductive portions on the base substrate are apart in the first direction;

wherein the orthographic projection of the twelfth conductive portion on the base substrate is between orthographic projections of two adjacent fourth conductive portions on the base substrate in the first direction.

In an example embodiment of the present disclosure, the pixel driving circuit further includes a second transistor. A first electrode of the second transistor is connected to the gate electrode of the driving transistor, and a second electrode of the second transistor is connected to the second electrode of the driving transistor.

The active layer further includes a second active portion and a fourteenth active portion. The second active portion is used to form a channel region of the second transistor. The fourteenth active portion is connected to the second active portion and the fourteenth active portion is also connected to the tenth conductive portion;

wherein an orthographic projection of the power supply line on the base substrate at least partially overlaps with the orthographic projection of the fourteenth active portion on the base substrate.

In an example embodiment of the present disclosure, the pixel driving circuit further includes a second transistor. A first electrode of the second transistor is connected to the gate electrode of the driving transistor, and a second electrode of the second transistor is connected to the second electrode of the driving transistor.

The active layer further includes a second active portion and a fourteenth active portion. The second active portion is used to form the channel region of the second transistor, and the fourteenth active portion is connected to the second active portion, and the fourteenth active portion is connected to the tenth conductive portion.

The third conductive layer further includes a second connection portion, the second connection portion is connected with the tenth conductive portion and the fourteenth active portion through vias, and an orthographic projection of the power supply line on the base substrate at least partially overlaps with an orthographic projection of the second connection portion on the base substrate.

In an example embodiment of the present disclosure, the display panel further includes a light-emitting unit, the pixel driving circuit is connected to a first electrode of the light-emitting unit, the pixel driving circuit further includes a first transistor and a seventh transistor, a first electrode of the first transistor is connected to a first initialization signal line, a second electrode of the first transistor is connected to the gate electrode of the driving transistor, a first electrode of the seventh transistor is connected to a second initialization signal line, and a second electrode of the seventh transistor is connected to the first electrode of the light-emitting unit;

wherein the active layer further includes:

a first active portion used to form a channel region of the first transistor;

a seventh active portion used to form a channel region of the seventh transistor;

the first initialization signal line connected to an end of the first active portion away from the tenth active portion; and the second initialization signal line connected to an end of the seventh active portion away from the tenth active portion.

In an example embodiment of the present disclosure, the pixel driving circuit further includes a first transistor, a first electrode of the first transistor is connected to a first initialization signal line, a second electrode of the first transistor is connected to the gate electrode of the driving transistor, and a gate electrode of the first transistor is connected to a reset line;

wherein the first conductive layer further includes a plurality of first conductive portions, orthographic projections of the plurality of first conductive portions on the base substrate are apart in the first direction, and a partial structure of each of the first conductive portions is used to form the gate electrode of the first transistor, and another partial structure of each of the first conductive portions is used to form the gate electrode of the first transistor in the same pixel driving circuit;

wherein the third conductive layer further includes the reset line, an orthographic projection of the reset line on the base substrate extends along the first direction, and the reset line is connected to the plurality of first conductive portions which are apart in the first direction through vias;

wherein a sheet resistance of the third conductive layer is smaller than a sheet resistance of the first conductive layer.

In an example embodiment of the present disclosure, the pixel driving circuit further includes a fourth transistor and a ninth transistor, a first electrode of the fourth transistor is connected to a data line, a second electrode of the fourth transistor is connected to the first electrode of the driving transistor, a gate electrode of the fourth transistor is connected to a first gate line, a first electrode of the ninth transistor is connected to an initialization signal line, a second electrode of the ninth transistor is connected to the gate electrode of the driving transistor, and a gate electrode of the ninth transistor is connected to the first gate line;

wherein the first conductive layer further includes a plurality of ninth conductive portions, orthographic projections of the plurality of the ninth conductive portions on the base substrate are apart in the first direction, and a partial structure of each of the ninth conductive portions is used to form the gate electrode of the four transistor, and another partial structure of the structure of each of the ninth conductive portions is used to form the gate electrode of the ninth transistor in a same pixel driving circuit;

wherein the third conductive layer further includes the first gate line, an orthographic projection of the first gate line on the base substrate extends along the first direction, and the first gate line is connected to the plurality of ninth conductive portions which are apart in the first direction through vias;

wherein a sheet resistance of the third conductive layer is smaller than a sheet resistance of the first conductive layer.

In an example embodiment of the present disclosure, the pixel driving circuit further includes a second transistor, a first electrode of the second transistor is connected to the gate electrode of the driving transistor, a second electrode of the second transistor is connected to the second electrode of the driving transistor, and a gate electrode of the second transistor is connected to a second gate line;

wherein the first conductive layer further includes a plurality of second conductive portions, orthographic projections of the plurality of second conductive portions on the base substrate are apart along the first direction, and the plurality of second conductive portions are used to form the gate electrode of the second transistor;

wherein the third conductive layer further includes the second gate line, an orthographic projection of the second gate line on the base substrate extends along the first direction, and the second gate line is connected to the plurality of second conductive portions which are apart in the first direction through vias.

In an example embodiment of the present disclosure, the active layer further includes:

a twelfth active portion connected to an end of the eighth active portion away from the eleventh active portion; and a thirteenth active portion connected to an end of the third active portion away from the eleventh active portion;

wherein the third conductive layer further includes the power supply line, an orthographic projection of the power supply line on the base substrate extends along a second direction, the second direction intersects with the first direction, and the power supply line is connected to the twelfth active portion through a via;

wherein the display panel further includes a fourth conductive layer arranged on a side of the third conductive layer away from the base substrate, the fourth conductive layer includes the reference voltage line, an orthographic projection of the reference voltage line on the base substrate extends along the second direction, and the reference voltage line is connected to the thirteenth active portion through a via.

In an example embodiment of the present disclosure, the pixel driving circuit further includes a first transistor, a first electrode of the first transistor is connected to an initialization signal line, and a second electrode of the first transistor is connected to the gate electrode of the driving transistor;

wherein the active layer further includes:

a first sub-active portion used to form a first channel region of the first transistor;

a second sub-active portion used to form a second channel region of the first transistor; and a third sub-active portion connected between the first sub-active portion and the second sub-active portion;

wherein an orthographic projection of the power supply line on the base substrate at least partially overlaps with an orthographic projection of the third sub-active portion on the base substrate.

In an example embodiment of the present disclosure, the pixel driving circuit further includes a second transistor, a first electrode of the second transistor is connected to the gate electrode of the driving transistor, and a second electrode of the second transistor is connected to the second electrode of the driving transistor;

wherein the active layer further includes:

a fourth sub-active portion used to form a channel region of the second transistor;

a fifth sub-active portion used to form the channel region of the second transistor;

a sixth sub-active portion connected between the fourth sub-active portion and the fifth sub-active portion;

wherein the fourth conductive layer further includes a seventeenth conductive portion connected to the reference voltage line;

wherein the display panel includes a first pixel driving circuit and a second pixel driving circuit arranged adjacently in the first direction;

wherein an orthographic projection of the seventeenth conductive portion in the first pixel driving circuit on the base substrate at least partially overlaps with an orthographic projection of the sixth sub-active portion in the second pixel driving circuit on the base substrate.

In an example embodiment of the present disclosure, the display panel further includes a light-emitting unit, the pixel driving circuit is connected to a first electrode of the light-emitting unit, the pixel driving circuit further includes a first transistor and a seventh transistor;

wherein a first electrode of the first transistor is connected to an initialization signal line, a second electrode of the first transistor is connected to the gate electrode of the driving transistor, a first electrode of the seventh transistor is connected to the initialization signal line, and a second electrode of the seventh transistor is connected to the first electrode of the light-emitting unit;

wherein there are a plurality of pixel driving circuits, and the plurality of pixel driving circuits includes a third pixel driving circuit and a fourth pixel driving circuit that are adjacent in a second direction, and the first direction and the second direction intersect with each other;

wherein the active layer may further include:

a first active portion used to form a channel region of the first transistor;

a seventh active portion used to form a channel region of the seventh transistor; and a fifteenth active portion connected between the first active portion in the third pixel driving circuit and the seventh active portion in the fourth pixel driving circuit;

wherein the display panel further includes a fourth conductive layer, the fourth conductive layer c includes the initialization signal line, an orthographic projection of the initialization signal line on the base substrate extends along the second direction, and the initialization signal line is connected to the fifteenth active portion through a via.

In an example embodiment of the present disclosure, the pixel driving circuit further includes a second transistor. A first electrode of the second transistor is connected to the gate electrode of the driving transistor, and a second electrode of the second transistor is connected to the second electrode of the driving transistor.

The active layer further includes a second active portion and a fourteenth active portion. The second active portion is used to form a channel region of the second transistor: the fourteenth active portion is connected to the second active portion, and the fourteenth active portion is connected to the tenth conductive portion.

The initialization signal line includes a first sub-initialization signal line, and an orthographic projection of the first sub-initialization signal line on the base substrate at least partially overlaps with an orthographic projection of the fourteenth active portion on the base substrate.

In an example embodiment of the present disclosure, the pixel driving circuit further includes a second transistor. A first electrode of the second transistor is connected to the gate electrode of the driving transistor, and a second electrode of the second transistor is connected to the second electrode of the driving transistor.

The active layer further includes a second active portion and a fourteenth active portion. The second active portion is used to form a channel region of the second transistor. The fourteenth active portion is connected to the second active portion, and the fourteenth active portion is connected to the tenth conductive portion.

The third conductive layer further includes a second connection portion, and the second connection portion is connected to the tenth conductive portion and the fourteenth active portion through vias.

The initialization signal line includes a first sub-initialization signal line, and an orthographic projection of the first sub-initialization signal line on the base substrate at least partially overlaps with an orthographic projection of the second connection portion on the base substrate.

In an example embodiment of the present disclosure, the initialization signal line further includes a second sub-initialization signal line, the second sub-initialization signal line is connected to the first sub-initialization signal line, and an orthographic projection of the second sub-initialization signal line on the base substrate at least partially overlaps with an orthographic projection of the power supply line on the base substrate.

In an example embodiment of the present disclosure, the pixel driving circuit further includes a first transistor, a second transistor and a fourth transistor;

wherein a first electrode of the first transistor is connected to an initialization signal line, a second electrode of the first transistor is connected to the gate electrode of the driving transistor, a gate electrode of the first transistor is connected to a reset signal line; a first electrode of the second transistor is connected to the gate electrode of the driving transistor, and a second electrode of the second transistor is connected to the second electrode of the driving transistor; a first electrode of the fourth transistor is connected to the data line, and a second electrode of the fourth transistor is connected to the first electrode of the driving transistor;

wherein the active layer further includes a second active portion and a fourteenth active portion. The second active portion is sued to form a channel region of the second transistor. The fourteenth active portion is connected to the second active portion, and the fourteenth active portion is also connected to the tenth conductive portion;

wherein the second conductive layer further includes:

the reset signal line, wherein an orthographic projection of the reset signal line on the base substrate extends along the first direction; and a thirteenth conductive portion connected to the reset signal line, wherein an orthographic projection of the thirteenth conductive portion on the base substrate is between an orthographic projection of the fourteenth active portion on the base substrate and an orthographic projection of the data line on the base substrate.

In an example embodiment of the present disclosure, there are a plurality of fifteenth active portions, and the active layer further includes:

an active line, wherein an orthographic projection of the active line on the base substrate extends along the first direction, and the active line is connected to the plurality of fifteenth active lines which are apart in the first direction.

In an example embodiment of the present disclosure, the pixel driving circuit further includes a second capacitor. A first electrode of the second capacitor is connected to the second electrode of the fifth transistor, and a second electrode of the second capacitor is connected to the first electrode of the driving transistor. The active layer further includes: a sixteenth active portion connected to an end of the fifth active part away from the eleventh active portion, wherein the sixteenth active portion is used to form the second electrode of the second capacitor. The second conductive layer further includes a fourteenth conductive portion connected to the eleventh conductive portion, wherein an orthographic projection of the fourteenth conductive portion on the base substrate at least partially overlaps with an orthographic projection of the sixteenth active portion on the base substrate, and the fourteenth conductive portion is used to form the first electrode of the second capacitor.

It is to be understood that the foregoing general description and the following detailed description are exemplary and explanatory only and are not intended to impose undue limitations on the present disclosure.

BRIEF DESCRIPTION OF THE DRAWINGS

The accompanying drawings, which are incorporated in and constitute a part of the description, illustrate embodiments consistent with the disclosure and serve to explain principles of the disclosure together with the description. Obviously, the drawings in the following description are only some embodiments of the present disclosure, and for those of ordinary skill in the art, other drawings can be obtained from these drawings without creative effort.

DETAILED DESCRIPTION

Figure 1:
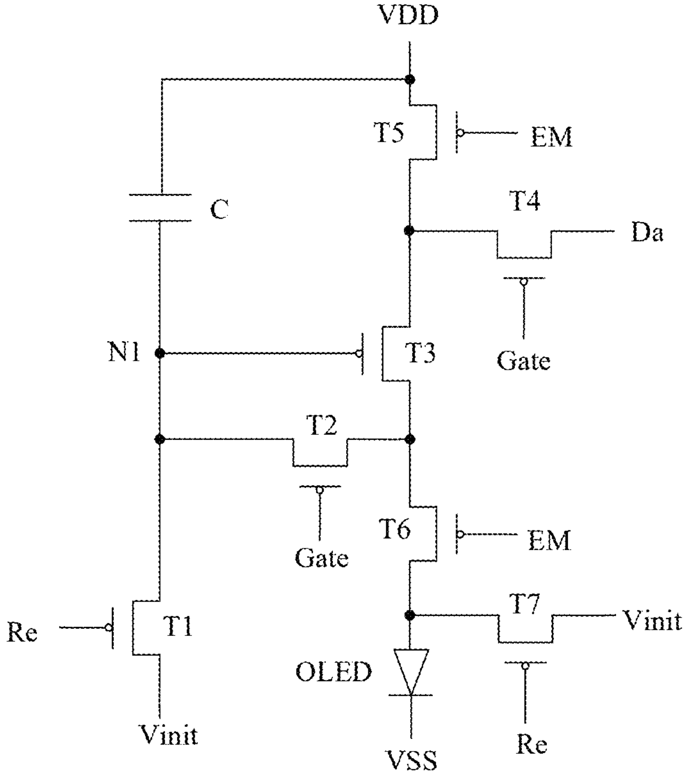
FIG. 1 (Prior Art)
FIG. 1 is a schematic diagram of a circuit structure of a pixel driving circuit in the related art.

Example embodiments will now be described more fully with reference to the accompanying drawings. However, the embodiments can be implemented in a variety of forms and should not be construed as being limited to the examples set forth herein; rather, these embodiments are provided so that the present disclosure will be more complete so as to convey the idea of the example embodiments to those skilled in this art. The same reference signs in the drawings indicate the same or similar structures, and thus their repeated descriptions will be omitted. In addition, the drawings are only schematic illustrations of embodiments of the present disclosure, and are not necessarily drawn to scale.

The terms "a", "an" and "the" are used to indicate the presence of one or more elements/components/etc.; the terms "include" and "have" are open terms and means inclusive, and refers to that in addition to the listed elements/components and so on, there may be other elements/components and so on.

FIG. 1 is a schematic diagram of a circuit structure of a pixel driving circuit in the related art. The pixel driving circuit may include: a first transistor T1, a second transistor T2, a driving transistor T3, a fourth transistor T4, a fifth transistor T5, a sixth transistor T6, a seventh transistor T7 and a capacitor C. A first electrode of the first transistor T1 is connected to a first node N1, a second electrode of the first transistor T1 is connected to an initialization signal terminal Vinit, and a gate electrode of the first transistor T1 is connected to a reset signal terminal Re. A first electrode of the second transistor T2 is connected to a first electrode of the driving transistor T3, a second electrode of the second transistor T2 is connected to the first node N1, and a gate electrode of the second transistor T2 is connected to a gate driving signal terminal Gate. A gate electrode of the driving transistor T3 is connected to the first node N1. A first electrode of the fourth transistor T4 is connected to a data signal terminal Data, a second electrode of the fourth transistor T4 is connected to a second electrode of the driving transistor T3, and a gate electrode of the fourth transistor T4 is connected to the gate driving signal terminal Gate. A first electrode of the fifth transistor T5 is connected to a first power supply terminal VDD, a second electrode of the fifth transistor T5 is connected to the second electrode of the driving transistor T3, and a gate electrode of the fifth transistor T5 is connected to an enable signal terminal EM. A first electrode of the sixth transistor T6 is connected to the first electrode of the driving transistor T3, and a gate electrode of the sixth transistor T6 is connected to the enable signal terminal EM. A first electrode of the seventh transistor T7 is connected to the initialization signal terminal Vinit, and a second electrode of the seventh transistor T7 is connected to a second electrode of the sixth transistor T6. The pixel driving circuit may be connected to a light-emitting unit OLED for driving the light-emitting unit OLED to emit light. The light-emitting unit OLED may be connected between the second electrode of the sixth transistor T6 and a second power supply terminal VSS. The transistors T1-T7 may all be P-type transistors.

Figure 2:
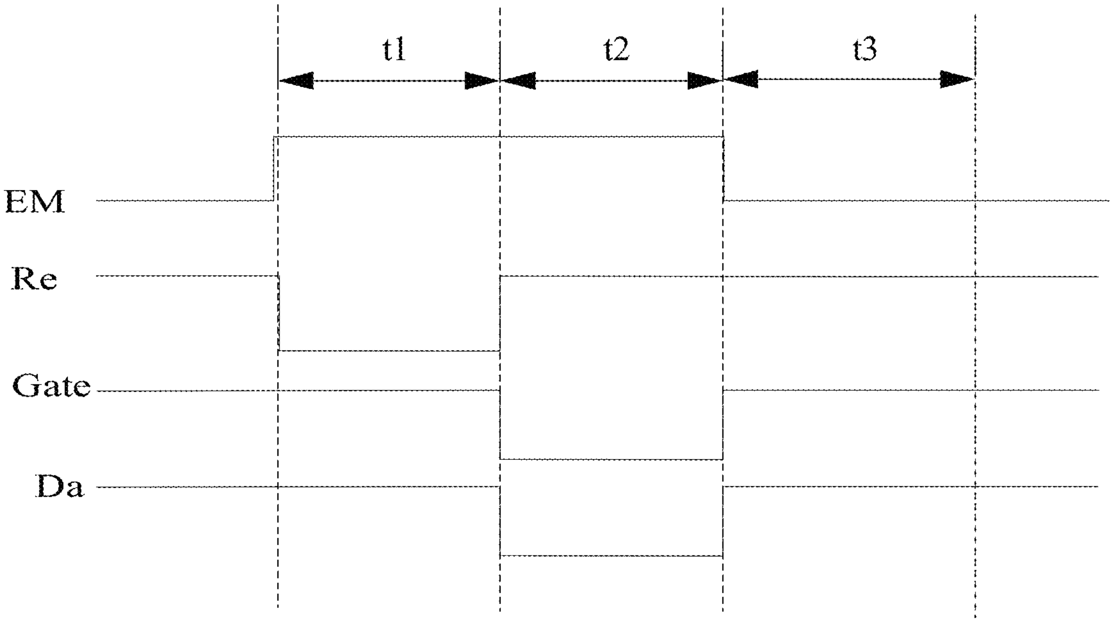
FIG. 2 (Prior Art)
FIG. 2 is a timing diagram of each node in a driving method for the pixel driving circuit of FIG. 1.

FIG. 2 is a timing diagram of each node in a driving method for the pixel driving circuit in FIG. 1. In FIG. 2, Gate represents the timing sequence of the gate driving signal terminal Gate, Re represents the timing sequence of the reset signal terminal Re, EM represents the timing sequence of the enable signal terminal EM, and Data represents the timing sequence of the data signal terminal Data. The driving method for the pixel driving circuit may include a reset stage t1, a compensation stage t2, and a light-emitting stage t3. In the reset stage t1: the reset signal terminal Re outputs a low level signal, the first transistor T1 the seventh transistor T7 are turned on, and the initialization signal terminal Vinit inputs the initialization signal to the first node N1 and the second electrode of the sixth transistor T6. In the compensation stage t2: the gate driving signal terminal Gate outputs a low level signal, the fourth transistor T4 and the second transistor T2 are turned on, and at the same time the data signal terminal Data outputs a driving signal to write a voltage Vdata+Vth to the first node N1, wherein Vdata is the voltage of the driving signal, and Vth is the threshold voltage of the driving transistor T3. In the light-emitting stage t3: the enable signal terminal EM outputs a low level signal, the sixth transistor T6 and the fifth transistor T5 are turned on, and the driving transistor T3 emits light under the action of the voltage Vdata+Vth stored in the capacitor C. According to the output current formula of the driving transistor: $I=(\mu WCox/2L)\ (Vgs-Vth)^2$, where u is the carrier mobility; Cox is the gate capacitance per unit area, W is the width of the channel of the driving transistor, L is the length of the channel of the driving transistor, Vgs is the gate-source voltage difference of the driving transistor, and Vth is the threshold voltage of the driving transistor. The output current of the driving transistor in the pixel driving circuit according to embodiments of the present disclosure is: $I=(\mu WCox/2L)\ (Vdata+Vth-Vdd-Vth)^2$. The pixel driving circuit can avoid the influence of the threshold value of the driving transistor on its output current. The first power supply terminal is provided by a power supply line on the display panel. However, due to the voltage drop (IR-drop) of the power supply line itself, the power supply lines at different positions on the display panel have different voltages, resulting in uneven display of the display panel under the same grayscale. The problem of uneven display is especially obvious in large-sized display panels or vertical screens.

Figure 3:
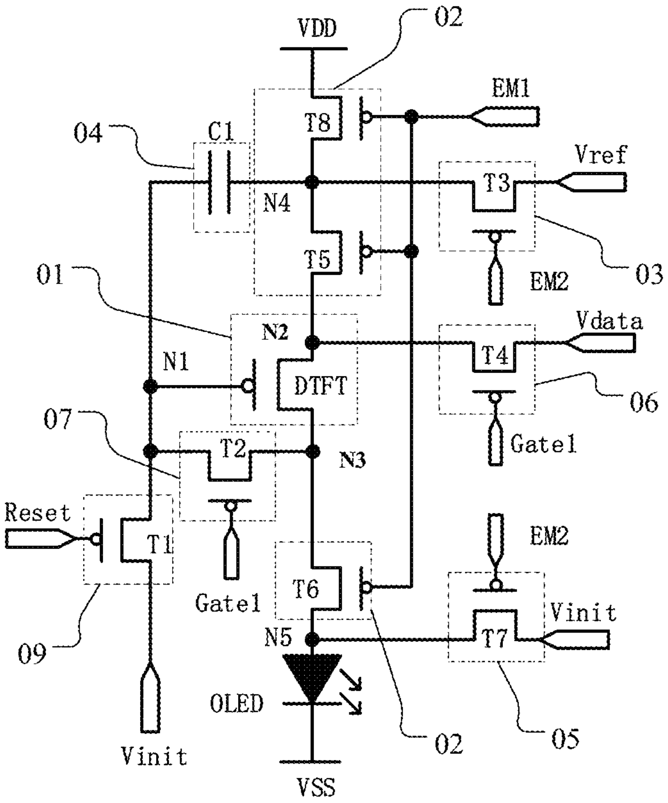
FIG. 3 is a schematic structural diagram of a pixel driving circuit according to an example embodiment of the present disclosure.

In view of the above, embodiments of the present disclosure provide a pixel driving circuit. FIG. 3 is a schematic structural diagram of the pixel driving circuit according to an embodiment of the present disclosure. The pixel driving circuit may include: a driving circuit 01, a control circuit 02, a voltage stabilization circuit 03, and a first storage circuit 04. The driving circuit 01 may be connected to a first node N1, a second node N2, and a third node N3, and is configured to provide a driving current to the third node N3 through the second node N2 according to a signal from the first node N1. The control circuit 02 may be connected to the first enable signal terminal EM1, the second node N2, a first power supply terminal VDD, and a fourth node N4 and is configured to create conduction between the second node N2 and the fourth node N4 in response to a signal from the first enable signal terminal EM1, and create conduction between the first power supply terminal VDD and the fourth node N4 in response to the signal from the first enable signal terminal EM1. The voltage stabilization circuit 03 may be connected to the fourth node N4, a second enable signal terminal EM2 and a reference voltage terminal Vref and is configured to transmit a signal from the reference voltage terminal Vref to the fourth node N4 in response to a signal from the second enable signal terminal EM2. The first storage circuit 04 is connected between the first node N1 and the fourth node N4 and is configured to store the electric charges of the first node N1 and the fourth node N4.

In an example embodiment, the driving circuit 01 may include a driving transistor DTFT, a first electrode of the driving transistor DTFT is connected to the second node N2, a second electrode of the driving transistor DTFT is connected to the third node N3, and a gate electrode of the driving transistor DTFT is connected to the first node N1. The control circuit 02 may include a fifth transistor T5 and an eighth transistor T8. A first electrode of the fifth transistor T5 is connected to the second node N2, a second electrode of the fifth transistor T5 is connected to the fourth node N4, and a gate electrode of the fifth transistor T5 is connected to the first enable signal terminal EM1. A first electrode of the eighth transistor T8 is connected to the fourth node N4, a second electrode of the eighth transistor T8 is connected to the first power supply terminal VDD, and a gate electrode of the eighth transistor T8 is connected to the first enable signal terminal EM1. The voltage stabilizing circuit 03 may include a third transistor T3. A first electrode of the third transistor T3 is connected to the reference voltage terminal Vref, a second electrode of the third transistor T3 is connected to the fourth node N4, and a gate electrode of the third transistor T3 is connected to the second enable Signal terminal EM2. The first storage circuit 04 may include a first capacitor C1 connected between the first node N1 and the fourth node N4.

The pixel driving circuit provided by the example embodiments can input an active level to the second enable signal terminal and an inactive level to the first enable signal terminal at least in a threshold compensation stage, so as to deliver the signal on the reference voltage terminal Vref to the fourth node N4. Also, in the threshold compensation stage, the voltage Vdata+Vth is written to the first node N1, where Vdata is a data signal, and Vth is the threshold voltage of the driving transistor. At this time, the voltage difference between the two terminals of the first capacitor C1 is Vdata+Vth−Vref, where Vref is the voltage of the reference voltage terminal. In a light-emitting stage, an active level may be input to the first enable signal terminal EM1, and an inactive level may be input to the second enable signal terminal EM2. Under the bootstrap action of the first capacitor C1, the voltage across the first capacitor C1 maintains the voltage at the threshold compensation stage, and accordingly the output current of the driving transistor is: $I=(\mu WCox/2L)(Vgs-Vth)^2=(\mu WCox/2L)(Vdata+Vth-Vref-Vth)^2$, where μ is the carrier mobility, Cox is the gate capacitance per unit area, W is the width of the channel of the driving transistor, L is the length of the channel of the driving transistor, and Vgs is the gate-source voltage difference of the driving transistor. Therefore, the current output by the pixel driving circuit has nothing to do with the voltage of the first power supply terminal VDD, that is, the display panel using the pixel driving circuit will not cause uneven display due to the voltage drop of the power supply line itself. At the same time, although the reference voltage line used to provide the reference voltage terminal also has resistance, there is no current on the reference voltage line after the reference voltage terminal Vref writes the voltage to the first capacitor C1, so that no voltage is generated on the reference voltage line. That is, the voltages of the reference voltage terminals at different positions of the display panel will not be different due to the resistance of the reference voltage lines themselves.

It should be understood that, in other example embodiments, the driving circuit, the first storage circuit, and the control circuit may also have other structures. For example, the driving circuit may include a plurality of parallel-connected driving transistors, and the first storage circuit may include a plurality of parallel-connected capacitors.

In some example embodiments, in order to ensure that the voltage across the first capacitor C1 is Vdata+Vth−Vref at the end of the threshold compensation stage, it is needed to input an active level to the second enable signal terminal EM2 at least in the threshold compensation stage. It should be understood that, in other example embodiments, an active level may also be input to the second enable signal terminal EM2 in other stages than the light-emitting stage. For example, an active level may be input to the second enable signal terminal EM2 in the reset stage before the threshold compensation stage, so that the reference voltage terminal Vref precharges the fourth node N4, thereby ensuring that the same voltage can be written to the fourth nodes N4 at different positions of the display panel before the threshold compensation phase ends. In some example embodiments, the polarity of the signal from the first enable signal terminal EM1 may be opposite to the polarity of the signal from the second enable signal terminal EM2.

In an example embodiment, as shown in FIG. 3, the control circuit 02 may further be connected to the third node N3, the fifth node N5, and the first enable signal terminal EM1, and the control circuit 02 is further configured to create conduction between the third node N3 and the fifth node N5 in response to the signal from the first enable signal terminal EM1. The control circuit 02 may further include a sixth transistor. A first electrode of the sixth transistor T6 is connected to the fifth node N5, a second electrode of the sixth transistor T6 is connected to the third node N3, and a gate electrode of the sixth transistor T6 is connected to the first enable signal terminal EM1. The pixel driving circuit may further include a first reset circuit 05. The first reset circuit 05 is connected to the initialization signal terminal Vinit and the fifth node N5, and is configured to transmit a signal from the initialization signal terminal Vinit to the fifth node N5 in response to at least one control signal. For example, the first reset circuit 05 may be connected to the second enable signal terminal EM2, and the first reset circuit 05 may be configured to transmit the signal from the initialization signal terminal Vinit to the fifth node N5 in response to a signal from the second enable signal terminal EM2. The first reset circuit 05 may include a seventh transistor T7. A first electrode of the seventh transistor T7 is connected to the initialization signal terminal Vinit, a second electrode of the seventh transistor T7 is connected to the fifth node N5, and a gate electrode of the seventh transistor T7 is connected to the second enable signal terminal EM2.

In an example embodiment, as shown in FIG. 3, the pixel driving circuit may further include: a data writing circuit 06 and a compensation circuit 07. The data writing circuit 06 may be connected to the second node N2 and the data signal terminal Vdata, and is configured to transmit a signal from the data signal terminal Vdata to the second node N2 in response to at least one control signal. The compensation circuit 07 may be connected to the third node N3 and the first node N1 and is configured to create conduction between the first node N1 and the third node N3 in response to at least one control signal. In an example embodiment, the data writing circuit 06 may be connected to a first gate driving signal terminal Gate1, and the data writing circuit 06 may be configured to transmit a signal from the data signal terminal Vdata to the second node N2 in response to a signal from the first gate driving signal terminal Gate1. The compensation circuit 07 may be connected to the first gate driving signal terminal Gate1, and the compensation circuit 07 may be configured to create conduction between the first node N1 and the third node N3 in response to the signal from the first gate driving signal terminal Gate1.

In an example embodiment, as shown in FIG. 3, the pixel driving circuit may further include a second reset circuit 09. The second reset circuit 09 is connected to the first node N1, the initialization signal terminal Vinit, and the reset signal terminal Reset. The second reset circuit 09 is configured to transmit a signal from the initialization signal terminal Vinit to the first node N1 in response to a signal from the reset signal terminal Reset.

In an example embodiment, as shown in FIG. 3, the data writing circuit 06 may include a fourth transistor T4. A first electrode of the fourth transistor T4 is connected to the data signal terminal Vdata, a second electrode of the fourth transistor T4 is connected to the second node N2, and a gate electrode of the fourth transistor T4 is connected to the first gate driving signal terminal Gate1. The compensation circuit 07 may include a second transistor T2. A first electrode of the second transistor T2 is connected to the first node N1, a second electrode of the second transistor T2 is connected to the third node N3, and a gate electrode of the second transistor T2 is connected to the first gate driving signal terminal Gate1. The second reset circuit 09 may include a first transistor T1. A first electrode of the first transistor T1 is connected to the initialization signal terminal Vinit, a second electrode of the first transistor T1 is connected to the first node N1, and a gate electrode of the first transistor T1 is connected to the reset signal terminal Reset.

In an example embodiment, the fifth node N5 may be used to connect a first electrode of a light-emitting unit OLED, a second electrode of the light-emitting unit OLED may be connected to a second power supply terminal VSS, and the light-emitting unit OLED may be a light-emitting diode. The first transistor T1 to the eighth transistor T8 and the driving transistor DTFT may all be P-type transistors, the first power supply terminal VDD may be a high level signal terminal, and the second power supply terminal VSS may be a low level signal terminal.

Figure 4:
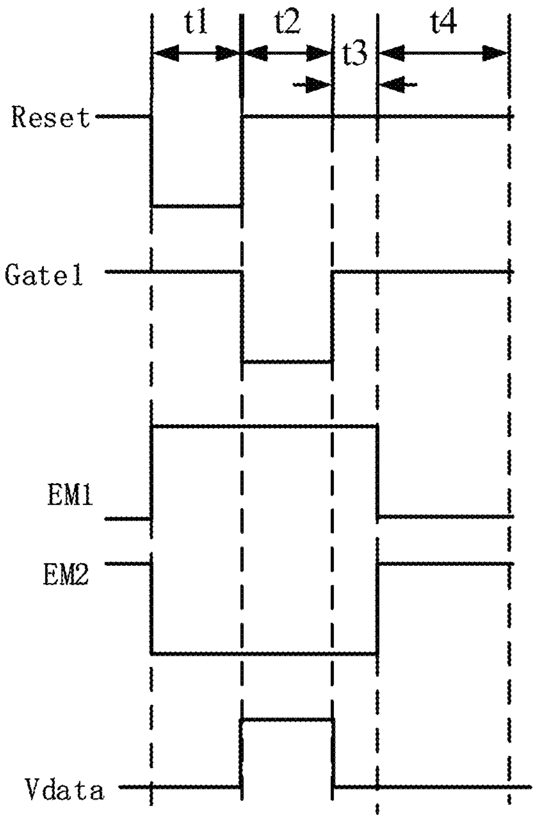
FIG. 4 is a timing diagram of each node of the pixel driving circuit in FIG. 3.

FIG. 4 is a timing diagram of each node of the pixel driving circuit in FIG. 3. In this figure, Reset is the timing diagram of the reset signal terminal Reset, Vinit is the timing diagram of the initialization signal terminal Vinit, EM1 is the timing diagram of the first enable signal terminal EM1, EM2 is the timing diagram of the second enable signal terminal EM2, and Vdata is the timing diagram of the data signal terminal Vdata, and Gate1 is the timing diagram of the first gate driving signal terminal Gate1. The driving method for the pixel driving circuit may include four stages: a reset stage t1, a threshold compensation stage t2, a buffer stage t3, and a light-emitting stage t4. In the reset phase t1, an active level (low level) may be input to the reset signal terminal Reset and the second enable signal terminal EM2, and an inactive level (high level) may be input to the first gate driving signal terminal Gate1 and the first enable signal terminal EM1. The first transistor T1, the seventh transistor T7, and the third transistor T3 are turned on, the initialization signal terminal Vinit inputs the initialization signal to the first node N1 and the fifth node N5, and the reference voltage terminal Vref precharges the reference voltage to the fourth node N4. Writing the initialization signal to the fifth node N5 can eliminate the carriers that are not recombined on the light-emitting interface inside the light-emitting diode, and relieve the aging of the light-emitting diode. In the threshold compensation stage t2, an active level is input to the first gate driving signal terminal Gate1 and the second enable signal terminal EM2, and an inactive level is input to the reset signal terminal Reset and the first enable signal terminal EM1. The second transistor T2, the fourth transistor T4, the seventh transistor T7, and the third transistor T3 are turned on, the reference voltage terminal Vref continues to write the reference voltage to the fourth node N4, and the data signal terminal Vdata writes the voltage Vdata+Vth to the first node N1. At this time, the voltage across the first capacitor C1 is Vdata+Vth−Vref, where Vdata is the voltage of the data signal terminal, Vth is the threshold voltage of the driving transistor, and Vref is the voltage of the reference voltage terminal. In the buffer stage t3, an active level is input to the second enable signal terminal EM2, and an inactive level is input to the first gate driving signal terminal Gate1, the reset signal terminal Reset, and the first enable signal terminal EM1. The voltage across the first capacitor C1 maintains at Vdata+Vth−Vref. In the light-emitting stage t4, an active level is input to the first enable signal terminal EM1, and an inactive level is input to the first gate driving signal terminal Gate1, the reset signal terminal Reset, and the second enable signal terminal EM2. The sixth transistor T6, the fifth transistor T5, and the eighth transistor T8 are turned on, and the voltage across the first capacitor C1 maintains at Vdata+Vth−Vref under the action of bootstrapping, so that the output current of the driving transistor is: $I=(\mu WCox/2L)(Vgs-Vth)^2=(uWCox/2L)(Vdata+Vth-Vref-Vth)^2$, where μ is the carrier mobility, Cox is the gate capacitance per unit area, W is the width of the channel of the driving transistor, L is the length of the channel of the driving transistor, and Vgs is the gate-source voltage difference of the driving transistor. The current output by the pixel driving circuit is irrelevant to the voltage of the first power supply terminal VDD, that is, the display panel using the pixel driving circuit will not cause uneven display due to the voltage drop in the power supply line itself.

Figure 5:
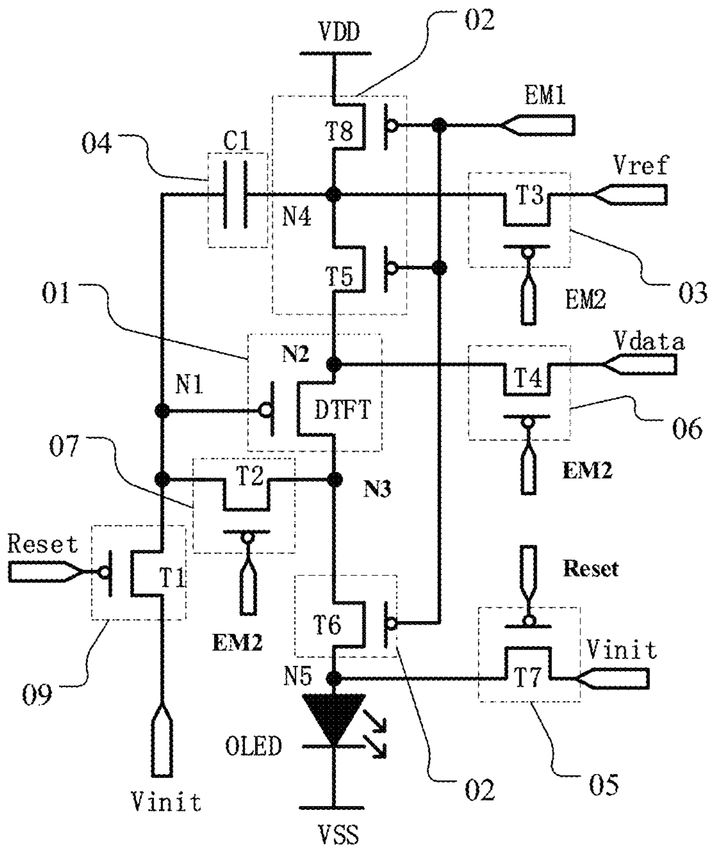
FIG. 5 is a schematic structural diagram of a pixel driving circuit according to an example embodiment of the present disclosure.
Figure 6:
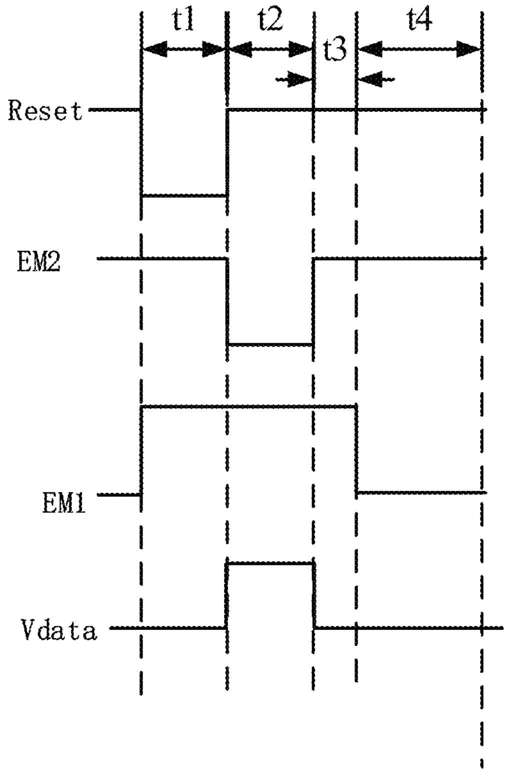
FIG. 6 is a timing diagram of each node in FIG. 5.

It should be understood that, in some other example embodiments, the data writing circuit 06, the compensation circuit 07, and the first reset circuit 05 may also have other connection manners. For example, FIG. 5 is a schematic diagram of the structure of the pixel driving circuit according to another example embodiment of the present disclosure. The data writing circuit 06 may be connected to the second enable signal terminal EM2, and the data writing circuit 06 is configured to transmit the signal from the data signal terminal Vdata to the second node N2 in response to the signal from the second enable signal terminal EM2. The compensation circuit 07 may be connected to the second enable signal terminal EM2, and the compensation circuit is configured to create conduction between the first node N1 and the third node N3 in response to the signal from the second enable signal terminal EM2. The first reset circuit 05 may be connected to the reset signal terminal Reset, and the first reset circuit is configured to transmit the signal from the initialization signal terminal Vinit to the fifth node N5 in response to the signal from the reset signal terminal Reset. FIG. 6 is a timing diagram of each node in FIG. 5. The driving method for the pixel driving circuit may also include four stages: a reset stage t1, a threshold compensation stage t2, a buffer stage t3, and a light-emitting stage t4. The difference between the pixel driving circuit shown in FIG. 5 and the pixel driving circuit shown in FIG. 3 is that the pixel driving circuit shown in FIG. 5 can control the data writing circuit 06, the compensation circuit 07, and the voltage stabilization circuit 03 only through the second enable signal terminal EM2, so that the voltage Vdata+Vth−Vref is written to both ends of the first capacitor C1 in the threshold compensation stage.

It should be understood that, according to some other example embodiments, in the driving method for the pixel driving circuit shown in FIG. 3 and FIG. 5, the buffer stage may be omitted. The control terminal of the first reset circuit 05 in FIG. 5 may also share the second enable signal terminal EM2, that is, the gate electrode of the seventh transistor T7 may be connected to the second enable signal terminal. The control terminal of the first reset circuit 05 in FIG. 3 may share the reset signal terminal Reset, that is, the gate electrode of the seventh transistor T7 may be connected to the reset signal terminal Reset. The first reset circuit and the second reset circuit may also be connected to initialization signal terminals with different potentials.

Figure 7:
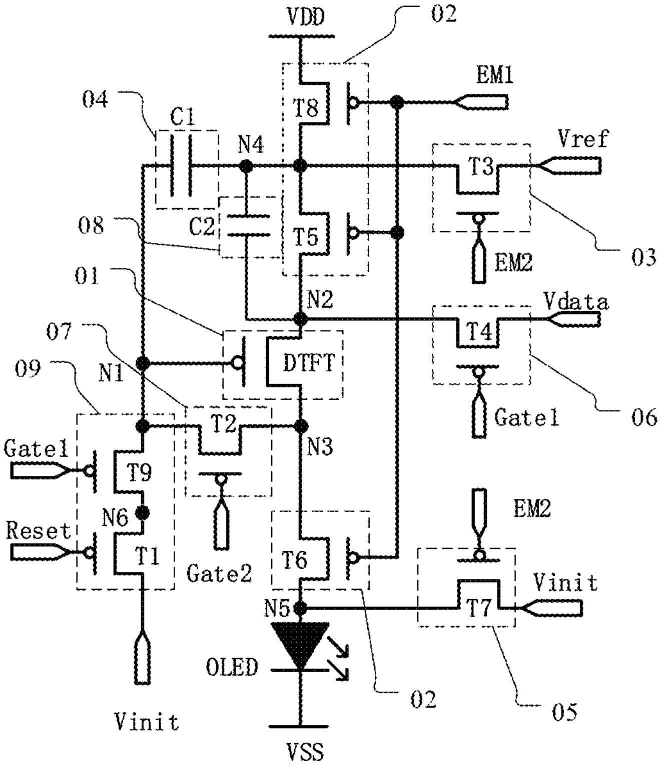
FIG. 7 is a schematic structural diagram of a pixel driving circuit according to an example embodiment of the present disclosure.

FIG. 7 is a schematic structural diagram of a pixel driving circuit according to another example embodiment of the present disclosure. The pixel driving circuit may further include a second storage circuit 08. The second storage circuit 08 may be connected between the second node N2 and the fourth node N4, and the second storage circuit 08 is configured to store the electric charges of the second node N2 and the fourth node N4. The data writing circuit 06 may further be connected to the first gate driving signal terminal Gate1, and the data writing circuit 06 may be configured to transmit the signal from the data signal terminal Vdata to the second node N2 in response to the signal from the first gate driving signal Gate1. The compensation circuit 07 may further be connected to the second gate driving signal terminal Gate2, and the compensation circuit 07 may be configured to create conduction between the first node N1 and the third node N3 in response to the signal from the second gate driving signal terminal Gate2. In an example embodiment, the second reset circuit 09 may be connected to the first node N1 and the initialization signal terminal Vinit and may be configured to transmit the signal from the initialization signal terminal Vinit to the first node N1 in response to at least one control signal. For example, the second reset circuit 09 may be connected to the reset signal terminal Reset, the first gate driving signal terminal Gate1 and the sixth node N6, and may be configured to create conduction between the sixth node N6 and the first node N1 in response to the signal from the first gate driving signal terminal Gate1.

In an example embodiment, as shown in FIG. 7, the data writing circuit 06 may include a fourth transistor T4. A first electrode of the fourth transistor T4 is connected to the data signal terminal Vdata, a second electrode of the fourth transistor T4 is connected to the second node N2, and a gate electrode of the fourth transistor T4 is connected to the first gate driving signal terminal Gate1. The compensation circuit 07 may include a second transistor T2. A first electrode of the second transistor T2 is connected to the first node N1, a second electrode of the second transistor T2 is connected to the third node N3, and a gate electrode of the second transistor T2 is connected to the second gate driving signal terminal Gate2. The second reset circuit 09 may include a first transistor T1 and a ninth transistor T9. A first electrode of the first transistor T1 is connected to the initialization signal terminal Vinit, a second electrode of the first transistor T1 is connected to the sixth node N6, and a gate electrode of the first transistor T1 is connected to the reset signal terminal Reset. A first electrode of the ninth transistor T9 is connected to the sixth node N6, a second electrode of the ninth transistor T9 is connected to the first node N1, and a gate electrode of the ninth transistor T9 is connected to the first gate driving signal terminal Gate1. The second storage circuit 08 may include a second capacitor C2 connected between the second node N2 and the fourth node N4. In some other example embodiments, the second storage circuit 08 may also be connected between the second node N2 and other stable voltage terminals.

In an example embodiment, the first transistor T1 to the ninth transistor T9 and the driving transistor DTFT may all be P-type transistors, the first power supply terminal VDD may be a high level signal terminal, and the second power supply terminal VSS may be a low level signal terminal.

Figure 8:
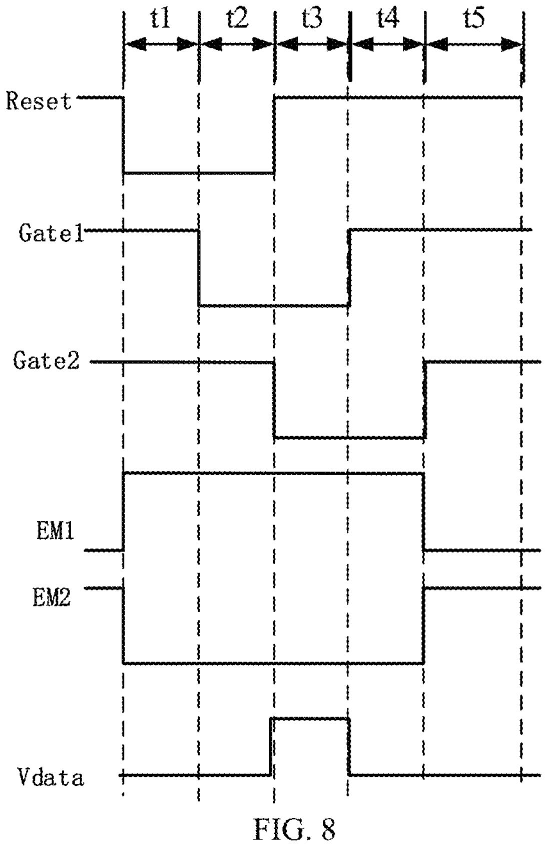
FIG. 8 is a timing diagram of each node of the pixel driving circuit in FIG. 7.

FIG. 8 is a timing diagram of each node of the pixel driving circuit in FIG. 7. In this figure, Reset is the timing diagram of the reset signal terminal Reset, Vinit is the timing diagram of the initialization signal terminal Vinit, EM1 is the timing diagram of the first enable signal terminal EM1, EM2 is the timing diagram of the second enable signal terminal EM2, Vdata is the timing diagram of the data signal terminal Vdata, Gate1 is the timing diagram of the first gate driving signal terminal Gate1, and Gate2 is the timing diagram of the second gate driving signal terminal Gate2. The driving method for the pixel driving circuit may include five stages: a first reset stage t1, a second reset stage t2, a first threshold compensation stage t3, a second threshold compensation stage t4, and a light-emitting stage t5. In the first reset phase t1, an active level (low level) is input to the reset signal terminal Reset and the second enable signal terminal EM2, and an inactive level (high level) is input to the first gate driving signal terminal Gate1, the first enable signal terminal EM1, and the second gate driving signal terminal Gate2. The seventh transistor T7 and the third transistor T3 are turned on. The reference voltage terminal Vref pre-writes the reference voltage to the fourth node N4, and the initialization signal terminal Vinit writes the initialization signal to the fifth node. In the second reset phase t2, an active level is input to the reset signal terminal Reset, the second enable signal terminal EM2 and the first gate driving signal terminal Gate1, and an inactive level is input to the first enable signal terminal EM1 and the second gate driving signal terminal Gate2. The first transistor T1, the ninth transistor T9, the seventh transistor T7, the third transistor T3, and the fourth transistor T4 are turned on. The initialization signal terminal Vinit writes the initialization signal to the first node N1. The reference voltage terminal Vref continues to write the reference voltage to the fourth node N4. In the first threshold compensation stage t3, an active level is input to the first gate driving signal terminal Gate1, the second enable signal terminal EM2 and the second gate driving signal terminal Gate2, and an inactive level is input to the reset signal terminal Reset and the first enable signal terminal EM1. The second transistor T2, the fourth transistor T4, the seventh transistor T7 and the third transistor T3 are turned on, and the voltage of the first node N1 continues to rise, and until the end of the first threshold compensation stage t3, the voltage of the first node N1 may still be in the rising stage. In the second threshold compensation stage t4, an active level is input to the second enable signal terminal EM2 and the second gate driving signal terminal Gate2, and an inactive level is input to the first gate driving signal terminal Gate1, the reset signal terminal Reset and the first enable signal terminal EM1. The second transistor T2 is turned on. The electric charge of the second node N2 stored in the second capacitor C2 continues to charge the first node until the voltage of the first node N1 is Vdata+Vth. At this time, the voltage across the first capacitor C1 is Vdata+Vth−Vref, where Vdata is the voltage of the data signal terminal, Vth is the threshold voltage of the driving transistor, and Vref is the voltage of the reference voltage terminal. In the light-emitting phase t5, an active level is input to the first enable signal terminal EM1, and an inactive level is input to the first gate driving signal terminal Gate1, the second gate driving signal terminal Gate2, the reset signal terminal Reset and the second enable signal terminal EM2. The sixth transistor T6, the fifth transistor T5, and the eighth transistor T8 are turned on, and the voltage across the first capacitor C1 maintains at Vdata+Vth−Vref under the action of bootstrapping, so that the output current of the driving transistor is: $I=(\mu WCox/2L)(Vgs-Vth)2=(\mu WCox/2L)(Vdata+Vth-Vref-Vth)^2$, where μ is the carrier mobility, Cox is the gate capacitance per unit area, W is the width of the channel of the driving transistor, L is the length of the channel of the driving transistor, and Vgs is the gate-source voltage difference of the driving transistor. The current output by the pixel driving circuit is irrelevant to the voltage of the first power supply terminal VDD, that is, the display panel using the pixel driving circuit will not cause uneven display due to the voltage drop in the power supply line itself. Compared with the pixel driving circuit shown in FIG. 3, the duration of the threshold compensation stage (t3 and t4) in the pixel driving circuit shown in FIG. 7 is longer than the pulse width (t3) of the valid data signal at the data signal terminal. In the case of the same pulse width of the valid data signal, the pixel driving circuit shown in FIG. 7 can have a longer threshold compensation period.

It should be understood that, in some other example embodiments, the gate electrode of the ninth transistor T9 may further be connected to the reset signal Reset. In an example embodiment, the gate electrode of the ninth transistor T9 may be connected to the first gate driving signal terminal Gate1, to facilitate the layout design of the display panel. The layout structures of the display panel will be described in detail in the following contents. In addition, the ninth transistor T9 may be omitted in the second reset circuit in FIG. 7.

An example embodiment of the present disclosure also provides a driving method for a pixel driving circuit, used to drive the above-mentioned pixel driving circuit. The driving method includes:

at least in a threshold compensation stage, inputting an inactive level to the first enable signal terminal EM1, and inputting an active level to the second enable signal terminal EM2; and in a light-emitting stage, inputting the active level to the first enable signal terminal EM1, and inputting the inactive level to the second enable signal terminal EM2.

The driving method for the pixel driving circuit has been described in detail in the above contents, and will not be repeated here.

An example embodiment of the present disclosure also provides a driving method for a pixel driving circuit, the method being configured to drive the pixel driving circuit described above. The driving method includes:

in a reset stage, inputting an active level to the reset signal terminal and the second enable signal terminal EM2, and inputting an inactive level to the first gate driving signal terminal Gate1 and the first enable signal terminal EM1;

in a threshold compensation stage, inputting the active level to the first gate driving signal terminal Gate1 and the second enable signal terminal EM2, and inputting the inactive level to the reset signal terminal and the first enable signal terminal EM1;

in a buffer stage, inputting an active level to the second enable signal terminal EM2, and inputting an inactive level to the first gate driving signal terminal Gate1, the reset signal terminal, and the first enable signal terminal EM1; and in a light-emitting stage, inputting the active level to the first enable signal terminal EM1, and inputting the inactive level to the first gate driving signal terminal Gate1, the reset signal terminal, and the second enable signal terminal EM2.

The driving method for the pixel driving circuit has been described in detail in the above contents, and will not be repeated here.

An example embodiment of the present disclosure further provides a driving method for a pixel driving circuit, the method being configured to drive the pixel driving circuit described above. The driving method includes:

in a first reset stage, inputting an active level to the reset signal terminal and the second enable signal terminal EM2, and inputting an inactive level to the first gate driving signal terminal Gate1, the first enable signal terminal EM1, and the second gate driving signal terminal Gate2;

in a second reset stage, inputting the active level to the reset signal terminal, the second enable signal terminal EM2, and the first gate driving signal terminal Gate1, and inputting the inactive level to the first enable signal terminal EM1 and the second gate driving signal terminal Gate2;

in a first threshold compensation stage, inputting the active level to the first gate driving signal terminal Gate1, the second enable signal terminal EM2 and the second gate driving signal terminal Gate2, and inputting the inactive level to the reset signal terminal and the first enable signal terminal EM1;

in a second threshold compensation stage, inputting the active level to the second enable signal terminal EM2 and the second gate driving signal terminal Gate2, and inputting the inactive level to the first gate driving signal terminal Gate1, the reset signal terminal and the first enable signal terminal EM1; and in a light-emitting stage, inputting the active level to the first enable signal terminal EM1, and inputting the inactive level to the first gate driving signal terminal Gate1, the second gate driving signal terminal Gate2, the reset signal terminal and the second enable signal terminal EM2.

The driving method for the pixel driving circuit has been described in detail in the above contents, and will not be repeated here.

An example embodiment further provides a display panel. The display panel includes the pixel driving circuit described in the above embodiments. The display panel can be applied to display devices such as mobile phones, tablet computers, and televisions.

Figure 9:
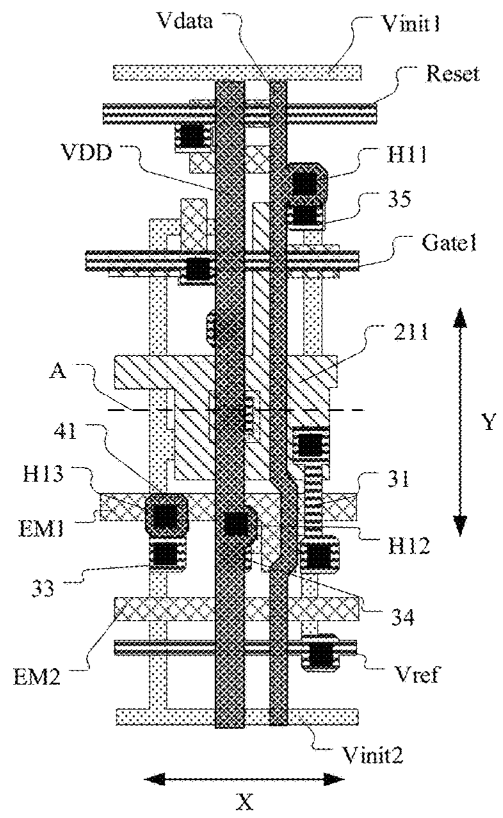
FIG. 9 is a structural layout of a display panel according to an example embodiment of the present disclosure.
Figure 10:
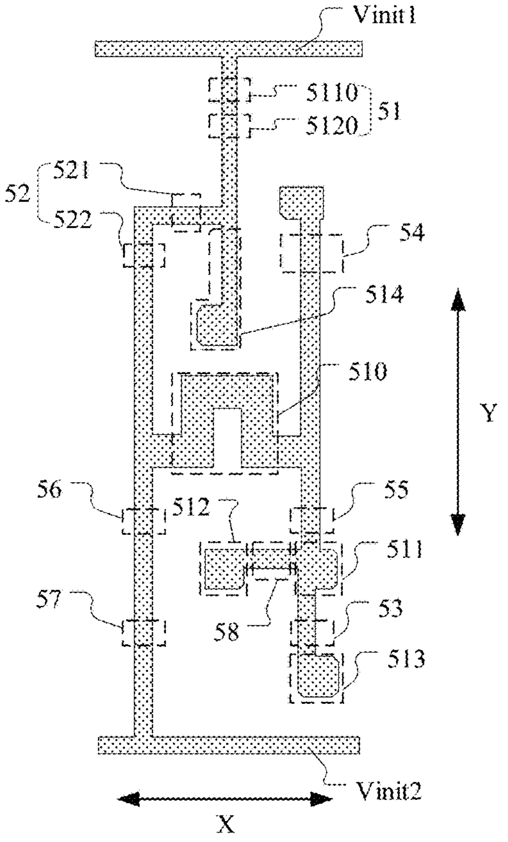
FIG. 10 is a structural layout of an active layer in FIG. 9.
Figure 11:
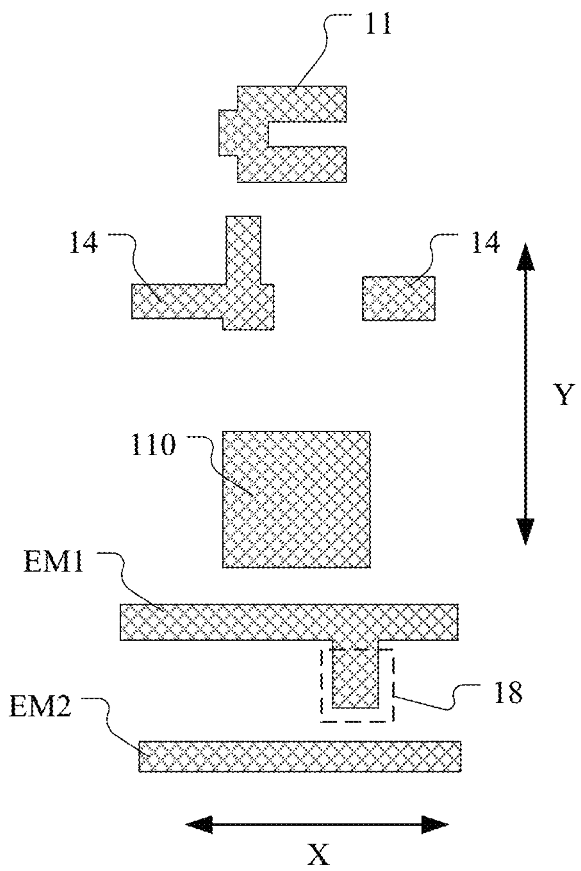
FIG. 11 is a structural layout of a first conductive layer in FIG. 9.
Figure 12:
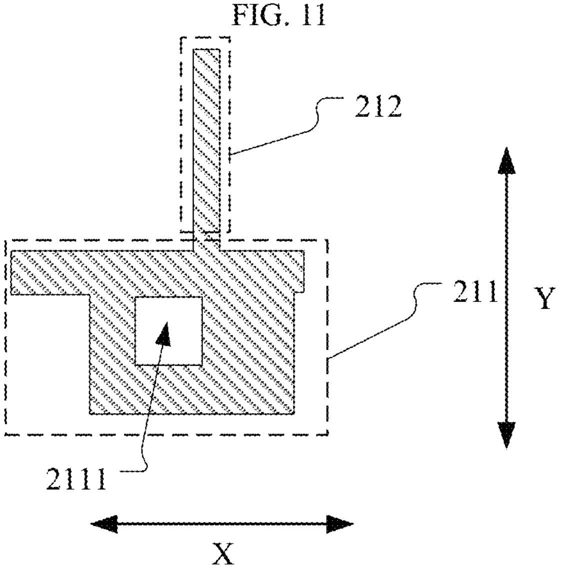
FIG. 12 is a structural layout of a second conductive layer in FIG. 9.
Figure 13:
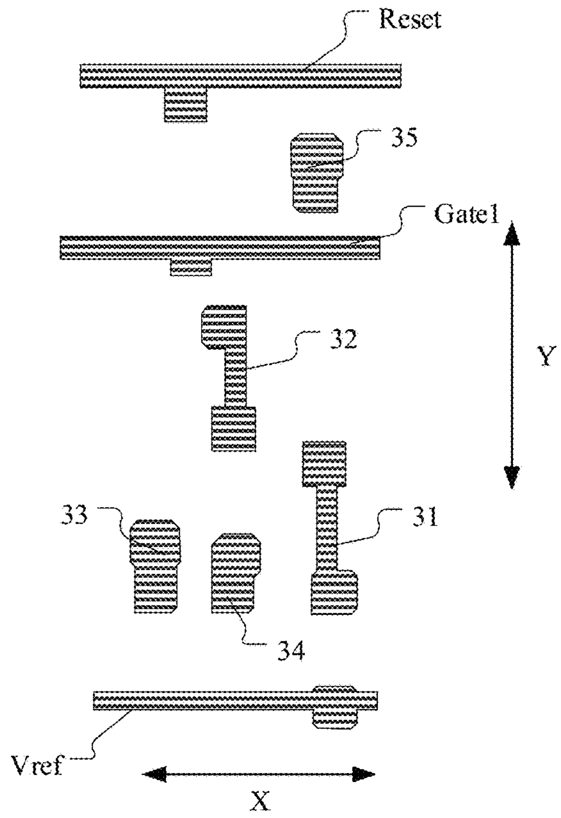
FIG. 13 is a structural layout of a third conductive layer in FIG. 9.
Figure 15:
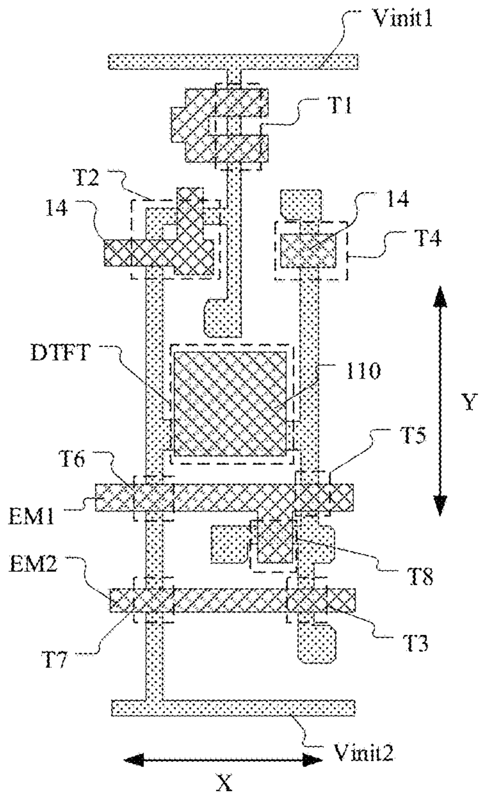
FIG. 15 is a structural layout of the active layer and the first conductive layer in FIG. 9.
Figure 16:
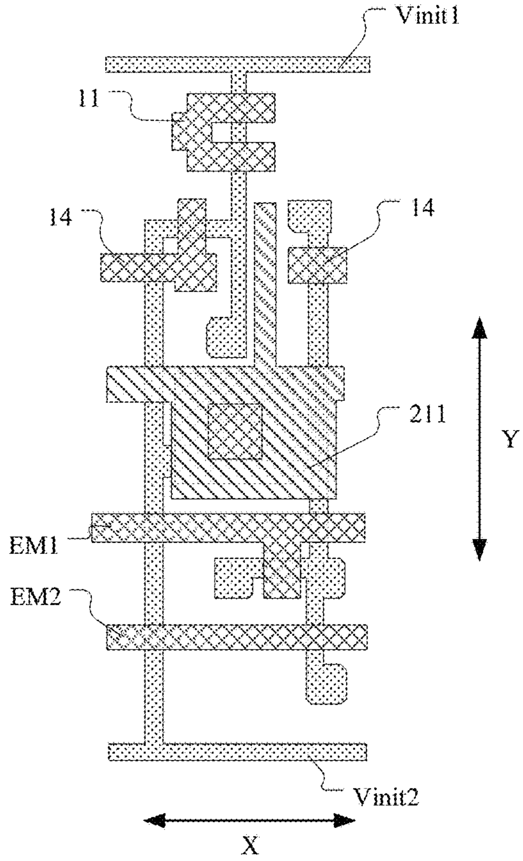
FIG. 16 is a structural layout of the active layer, the first conductive layer, and the second conductive layer in FIG. 9.
Figure 17:
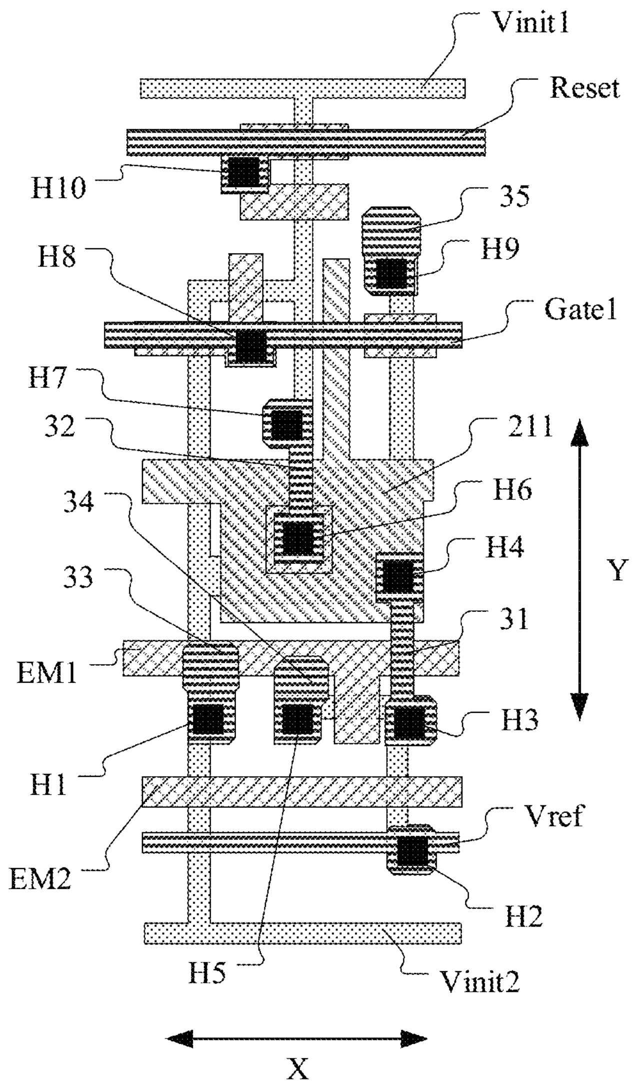
FIG. 17 is a structural layout of the active layer, the first conductive layer, the second conductive layer, and the third conductive layer in FIG. 9.

An example embodiment further provides a display panel. The display panel may include a pixel driving circuit as shown in FIG. 3. The display panel may include a base substrate, an active layer, a first conductive layer, a second conductive layer, a third conductive layer, and a fourth conductive layer sequentially stacked, as shown in FIGS. 9 to 17. FIG. 9 is a structural layout of a display panel according to an example embodiment of the present disclosure. FIG. 10 is the structural layout of the active layer in FIG. 9. FIG. 11 is the structural layout of the first conductive layer in FIG. 9. FIG. 12 is the structural layout of the second conductive layer in FIG. 9. FIG. 13 is the structural layout of the third conductive layer in FIG. 9. FIG. 13 is the structural layout of the fourth conductive layer in FIG. 9. FIG. 15 is the structural layout of the active layer and the first conductive layer in FIG. 9. FIG. 16 is the structural layout of the active layer, the first conductive layer, and the second conductive layer in FIG. 9. FIG. 17 is the structural layout of the active layer, the first conductive layer, the second conductive layer, and the third conductive layer in FIG. 9.

As shown in FIGS. 9, 10 and 15, the active layer may include a first active portion 51, a second active portion 52, a third active portion 53, a fourth active portion 54, a fifth active portion 55, a sixth active portion 56, a seventh active portion 57, an eighth active portion 58, a tenth active portion 510, an eleventh active portion 511, a twelfth active portion 512, a thirteenth active portion 513, a fourteenth active portion 514, a first initialization signal line Vinit1, and a second initialization signal line Vinit2. The first active portion 51 includes a sub-active portion 5110 and a sub-active portion 5120. The sub-active portion 5110 and the sub-active portion 5120 may be used to form two channel regions of the first transistor. The second active portion 52 may include a sub-active portion 521 and a sub-active portion 522. The sub-active portion 521 and the sub-active portion 522 may be used to form two channel regions of the second transistor. The third active portion 53 is used to form a channel region of the third transistor T3. The fourth active portion 54 is used to form a channel region of the fourth transistor T4. The fifth active portion 55 is used to form a channel region of the fifth transistor T5. The sixth active portion 56 is used to form a channel region of the sixth transistor T6. The seventh active portion 57 is used to form a channel region of the seventh transistor T7. The eighth active portion 58 is used to form a channel region of the eighth transistor T8. The tenth active portion 510 is used to form a channel region of the driving transistor DTFT. The eleventh active portion 511 may be connected to the third active portion 53, the fifth active portion 55, and the eighth active portion 58. The tenth active portion 510 may be connected to an end of the fifth active portion 55 away from the eleventh active portion 511. The twelfth active portion 512 may be connected to an end of the eighth active portion 58 away from the eleventh active portion 511. The thirteen active portions 513 may be connected to an end of the third active portion 53 away from the eleventh active portion 511. The first initialization signal line Vinit1 is connected to an end of the first active portion 51 away from the fourteenth active portion 514 for providing the initialization signal terminal to the first transistor T1. The second initialization signal line Vinit2 may be connected to an end of the seventh active portion 57 away from the sixth active portion 56 for providing an initialization signal terminal to the seventh transistor T7. An orthographic projection of the first initialization signal line Vinit1 on the base substrate and an orthographic projection of the second initialization signal line Vinit2 on the base substrate may both extend along a first direction X. The first direction X may be the row direction of the display panel. Two adjacent pixel driving circuits in the column direction may share an initialization signal line. For example, the first initialization signal line Vinit1 may further be used to provide an initialization signal terminal to the seventh transistor T7 in the pixel driving circuits of the preceding row. The second initialization signal line Vinit2 may further be used to provide an initialization signal terminal to the first transistor T1 in the pixel driving circuits of a following row or a next row. The active layer may be formed of a polysilicon semiconductor, and the first to eighth transistors and the driving transistors may all be low temperature polysilicon transistors.

As shown in FIGS. 9, 11 and 15, the first conductive layer may include: a first enable signal line EM1, a second enable signal line EM2, a tenth conductive portion 110, an eighth conductive portion 18, a first conductive portion 11, and a plurality of fourth conductive portions 14. An orthographic projection of the tenth conductive portion 110 on the base substrate may cover an orthographic projection of the tenth active portion 510 on the base substrate. The tenth conductive portion 110 may be used for forming the gate electrode of the driving transistor and the first electrode of the first capacitor. An orthographic projection of the first enable signal line EM1 on the base substrate may extend along the first direction X, and the orthographic projection of the first enable signal line EM1 on the base substrate may cover the orthographic projection of the fifth active portion 55 on the base substrate. A partial structure of the first enable signal line EM1 may be used for forming the gate electrode of the fifth transistor T5. An orthographic projection of the second enable signal line EM2 on the base substrate may extend along the first direction X, and an orthographic projection of the second enable signal line EM2 on the base substrate may cover an orthographic projection of the third active portion 53 on the base substrate. A partial structure of the second enable signal line EM2 may be used to form the gate electrode of the third transistor T3. The eighth conductive portion 18 may be connected to the first enable signal line EM1. An orthographic projection of the eighth conductive portion 18 on the base substrate may cover an orthographic projection of the eighth active portion 58 on the base substrate. The eighth conductive portion 18 may be used to form the gate electrode of the eighth transistor T8. The first conductive portion 11 may be used to form the gate electrode of the first transistor. Orthographic projections of the plurality of fourth conductive portions 14 on the base substrate may be apart in the first direction X. A partial structure of the fourth conductive portions 14 may be used for forming the gate electrode of the second transistor in one pixel driving circuit, another part of the structure of the conductive portion 14 may be used to form the gate electrode of the fourth transistor in another pixel driving circuit, and the two pixel driving circuits can be arranged adjacent to each other in the first direction X. As shown in FIG. As shown in FIG. 11, a partial structure of the fourth conductive portion 14 on the left is used to form the gate electrode of the second transistor in the pixel driving circuit, and the other part of the structure of the fourth conductive portion 14 on the left (not shown in the figure) can be used to form the gate electrode of the fourth transistor in a pixel driving circuit on the left side of the pixel driving circuit. In addition, the display panel can use the first conductive layer as a mask to perform conductorization treatment on the active layer, the area covered by the first conductive layer can form the channel regions of the transistors, and the area not covered by the first conductive layer can form a conductor structure.

As shown in FIGS. 9, 12 and 16, the second conductive layer may include an eleventh conductive portion 211 and a twelfth conductive portion 212. The eleventh conductive portion 211 is provided with an opening 2111. An orthographic projection of the eleventh conductive portion 211 on the base substrate may at least partially overlap with the orthographic projection of the tenth conductive portion on the base substrate. The eleventh conductive portion 211 may be used to form the second electrode of the first capacitor C. The twelfth conductive portion 212 may be connected to the eleventh conductive portion 211, and an orthographic projection of the twelfth conductive portion 212 on the base substrate may extend along a second direction Y. The second direction Y may be the column direction of the display panel.

As shown in FIGS. 9, 13 and 17, the third conductive layer may include a reference voltage line Vref, a first gate line Gate1, a reset signal line Reset, a first connection portion 31, a second connection portion 32, an interconnection portion 33, an interconnection portion 34 and an interconnection portion 35. An orthographic projection of the reference voltage line Vref on the base substrate, an orthographic projection of the first gate line Gate1 on the base substrate and an orthographic projection of the reset signal line Reset on the base substrate may all extend along the first direction X. The reference voltage line Vref is used for providing the reference voltage terminal, the first gate line Gate1 is used for providing the first gate driving signal terminal, and the reset signal line Reset is used for providing the reset signal terminal. As shown in FIG. 17, the reference voltage line Vref may be connected to the thirteenth active portion 513 through a via H2 to connect the first electrode of the third transistor T3 and the reference voltage terminal. The first connection portion 31 may be connected to the eleventh active portion 511 through a via H3 and the eleventh conductive portion 211 through a via H4 to connect the second electrode of the third transistor and the second electrode of the first capacitor C1. The interconnection portion 34 may be connected to the twelfth active portion 512 through a via hole H5 to connect to the second electrode of the eighth transistor. The interconnection portion 33 may be connected to an active layer between the sixth active portion 56 and the seventh active portion 57 through a via H1 to connect the fifth node. The second connection portion 32 may be connected to the tenth conductive portion 110 through a via H6 and the fourteenth active portion 514 through via hole H7 to connect the gate electrode of the driving transistor and the first electrode of the second transistor. An orthographic projection of the via H6 on the base substrate may be located within the orthographic projection of the opening 2111 on the base substrate, so as to insulate the via H6 from the eleventh conductive portion 211. The interconnection portion 35 may be connected to an active layer at one end of the fourth active portion 54 away from the tenth active portion 510 through a via H9, so as to connect to the first electrode of the fourth transistor. The reset signal line Reset may be connected to a plurality of first conductive portions 11 in the same row through vias, so as to connect the gate electrodes of the first transistors and the reset signal terminal. The first gate line Gate1 may be connected to the second conductive portion 14 through avia H8 to connect the first gate driving signal terminal and the gate electrode of the second transistor, and the first gate driving signal terminal and the gate electrode of the fourth transistor. In an example embodiment, a sheet resistance of the third conductive layer may be smaller than a sheet resistance of the second conductive layer. In an example embodiment, the reference voltage line Vref, the first gate line Gate1, and the reset signal line Reset are all set at the third conductive layer, which can improve the response speed of the first transistor, the fourth transistor, and the second transistor.

Figure 14:
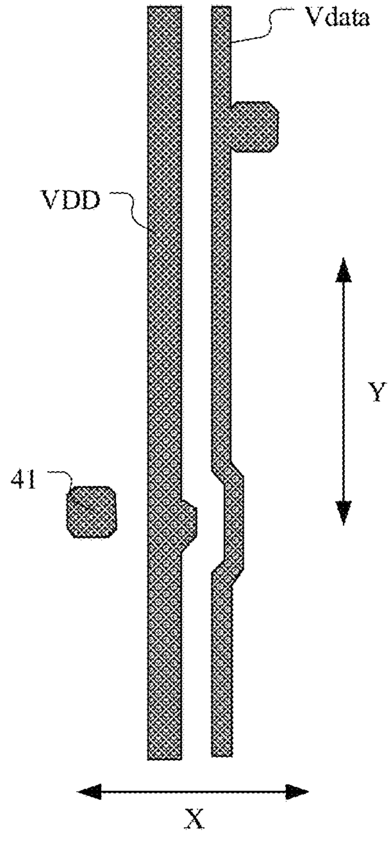
FIG. 14 is a structural layout of a fourth conductive layer in FIG. 9.

As shown in FIGS. 9 and 14, the fourth conductive layer may include a power supply line VDD, a data line Vdata, and an interconnection portion 41. The power supply line VDD is used to provide the first power supply terminal, and the data line Vdata is used to provide the data signal terminal. An orthographic projection of the power supply line VDD on the base substrate and an orthographic projection of the data line Vdata on the base substrate can both extend along the second direction Y. The power supply line VDD may be connected to the interconnection portion 34 through a via H12 to connect the second electrode of the eighth transistor and the first power supply terminal. The data line Vdata may be connected to the interconnection portion 35 through a via H11 to connect the first electrode of the fourth transistor and the data signal terminal. The interconnection portion 41 may be connected to the interconnection portion 33 through a via H13, and the interconnection portion 41 may be used to connect the first electrode of the light-emitting unit. As shown in FIG. 9, an orthographic projection of the power supply line VDD on the base substrate and an orthographic projection of the fourteenth active portion 514 on the base substrate may at least partially overlap, and the power supply line VDD can play a role of voltage stabilization on the gate electrode of the driving transistor, so as to reduce the voltage fluctuation of the gate electrode of the driving transistor during the light-emitting phase. The orthographic projection of the power supply line VDD on the base substrate may at least partially overlap with the orthographic projection of the second connection portion 32 on the base substrate. Similarly, the power supply line VDD can play a role of voltage stabilization on the gate electrode of the driving transistor, so as to reduce the voltage fluctuation of the gate electrode of the driving transistor during the light-emitting phase. At least part of the orthographic projection of the twelfth conductive portion 212 on the base substrate may be located between the orthographic projection of the fourteenth active portion 414 on the base substrate and the orthographic projection of the data line Vdata on the base substrate. In the light-emitting stage, the twelfth conductive portion 212 is connected to the power supply line VDD, and the twelfth conductive portion 212 can shield the interference of the data line Vdata to the fourteenth active portion 414, thereby further stabilizing the voltage of the gate electrode of the driving transistor. As shown in FIGS. 9 and 16, the orthographic projection of the twelfth conductive portion 212 on the base substrate may be located between orthographic projections of two adjacent fourth conductive portions 14 in the first direction X on the base substrate, that is, the orthographic projection of the twelfth conductive portion 212 on the base substrate does not intersect with the orthographic projections of the fourth conductive portions 14 on the base substrate. This setting can reduce the parasitic capacitance on the fourth conductive portion 14, thereby increasing the response speed of the second transistor and the fourth transistor.

Figure 18:
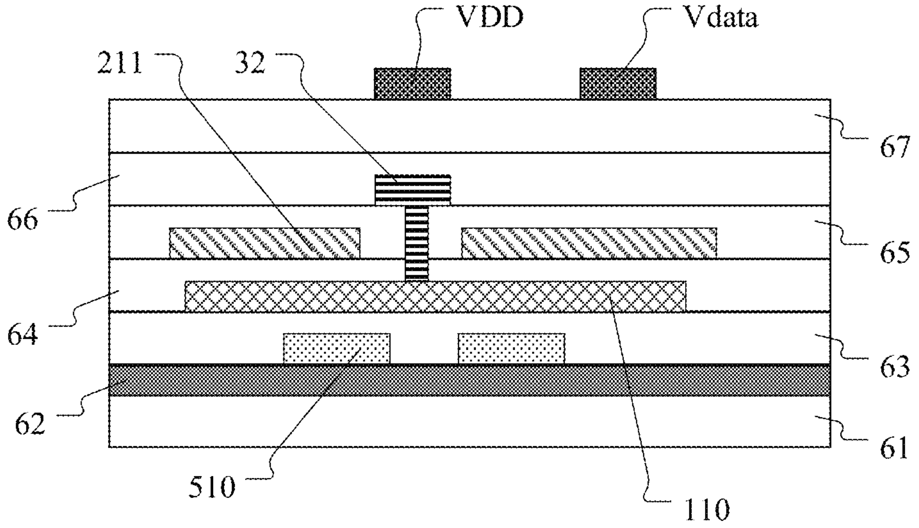
FIG. 18 is a partial cross-sectional view of the position of dotted line A in FIG. 9.

FIG. 18 is a partial cross-sectional view at the position of the dotted line A in FIG. 9. The display panel may further include a buffer layer 62, a first insulating layer 63, a second insulating layer 64, a dielectric layer 65, a passivation layer 66, and a planarization layer 67. The base substrate 61, the buffer layer 62, the active layer, the first insulating layer 63, the first conductive layer, the second insulating layer 64, the second conductive layer, the dielectric layer 65, the third conductive layer, the passivation layer 66, the planarization layer 67, and the fourth conductive layer can be stacked in sequence. The buffer layer 62 may include at least one of a silicon oxide layer and a silicon nitride layer. The first insulating layer 63 and the second insulating layer 64 may be silicon oxide layers. The dielectric layer may be a silicon nitride layer. The material of the passivation layer 66 may include an organic insulating material or an inorganic insulating material, for example, a silicon nitride material. The material of the planarization layer 67 may be an organic material such as an organic resin. The material of the first conductive layer and the second conductive layer can be one of molybdenum, aluminum, copper, titanium, and niobium or an alloy thereof, or a molybdenum/titanium alloy or a stack thereof or the like. The materials of the third conductive layer and the fourth conductive layer may include metal materials, such as one of molybdenum, aluminum, copper, titanium, and niobium, or an alloy thereof, or molybdenum/titanium alloy or a stack thereof, or may be a stack of titanium/aluminum/titanium. The base substrate 61 may include a glass substrate, a blocking layer, and a polyimide layer stacked in sequence, and the blocking layer may be an inorganic material.

Figure 19:
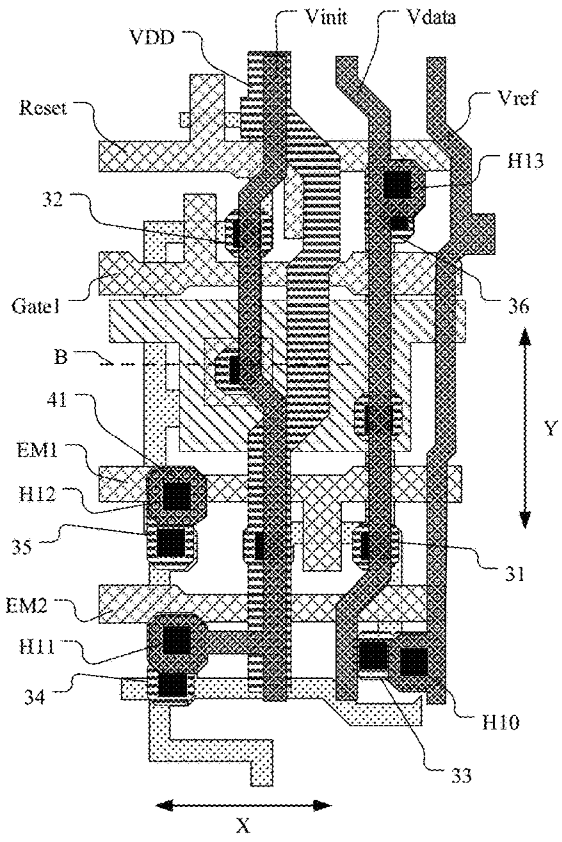
FIG. 19 is a structural layout of a display panel according to an example embodiment of the present disclosure.
Figure 20:
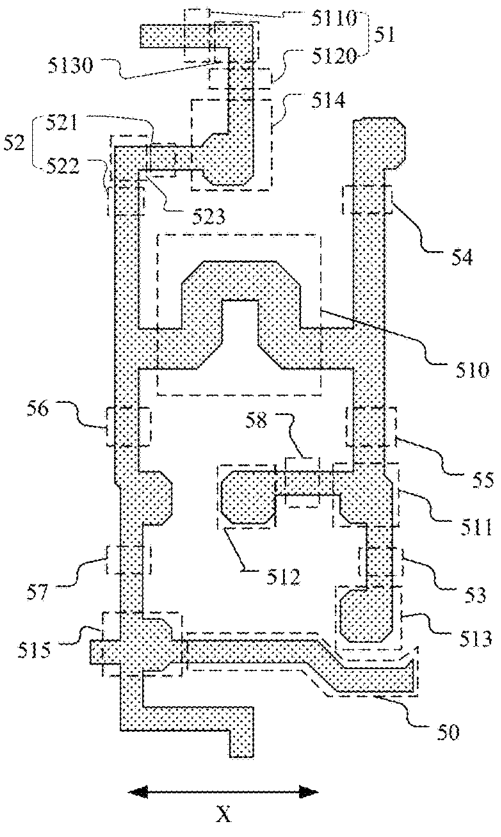
FIG. 20 is a structural layout of an active layer in FIG. 19.
Figure 21:
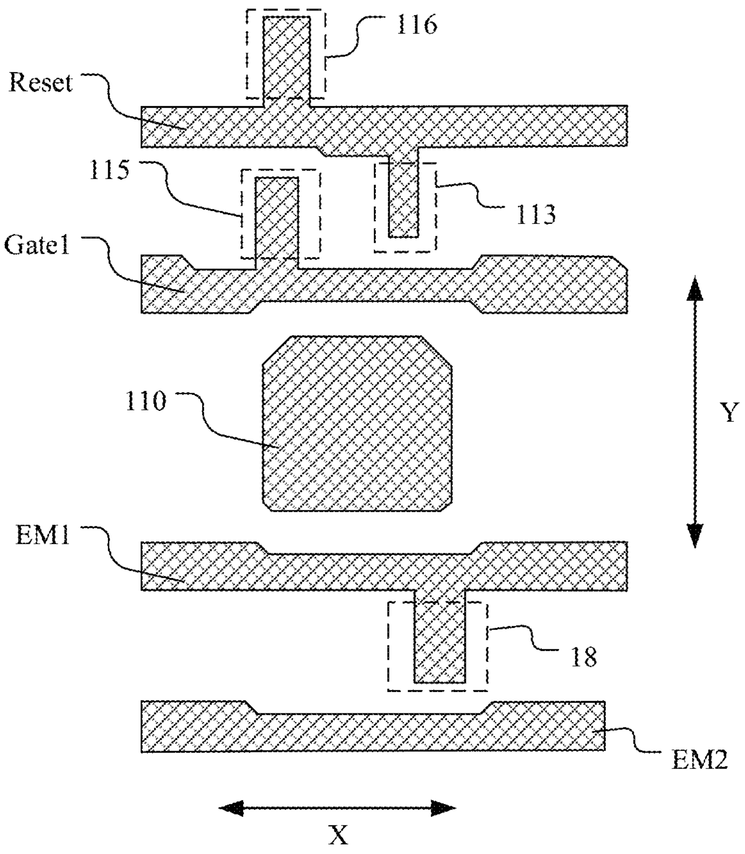
FIG. 21 is a structural layout of a first conductive layer in FIG. 19.
Figure 22:
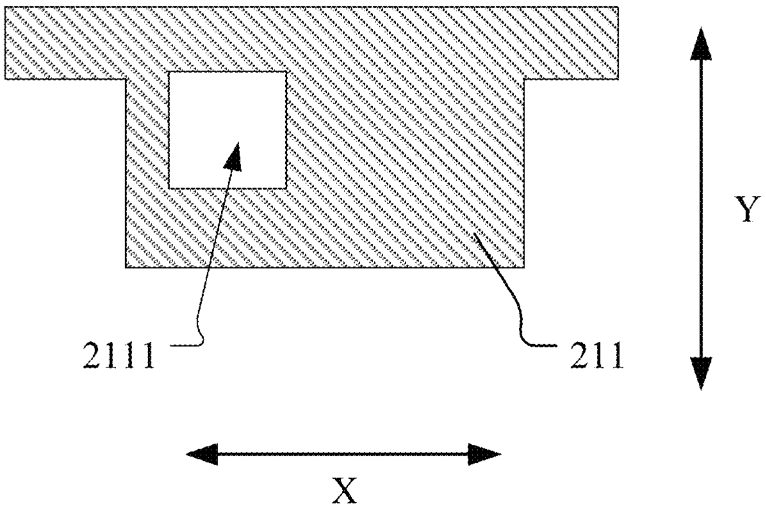
FIG. 22 is a structural layout of a second conductive layer in FIG. 19.
Figure 23:
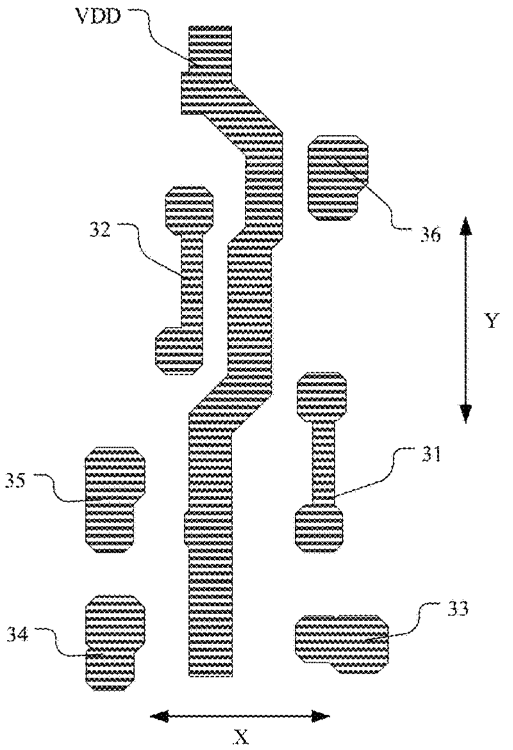
FIG. 23 is a structural layout of a third conductive layer in FIG. 19.

An example embodiment further provides another display panel, and the display panel may include a pixel driving circuit as shown in FIG. 3. The display panel may include a base substrate, an active layer, a first conductive layer, a second conductive layer, a third conductive layer, and a fourth conductive layer that are stacked in sequence, as shown in FIGS. 19-27. FIG. 19 is a structural layout of a display panel in an example embodiment of the present disclosure. FIG. 20 is a structural layout of the active layer in FIG. 19. FIG. 21 is a structural layout of the first conductive layer in FIG. 19. FIG. 22 is a structural layout of the second conductive layer in FIG. 19. FIG. 23 is a structural layout of the third conductive layer in FIG. 19.

Figure 24:
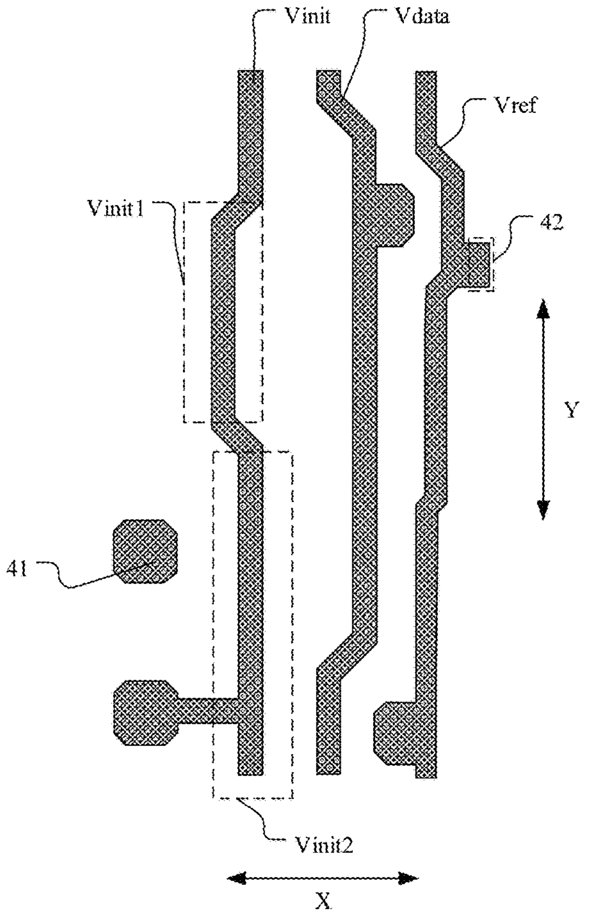
FIG. 24 is a structural layout of a fourth conductive layer in FIG. 19.
Figure 25:
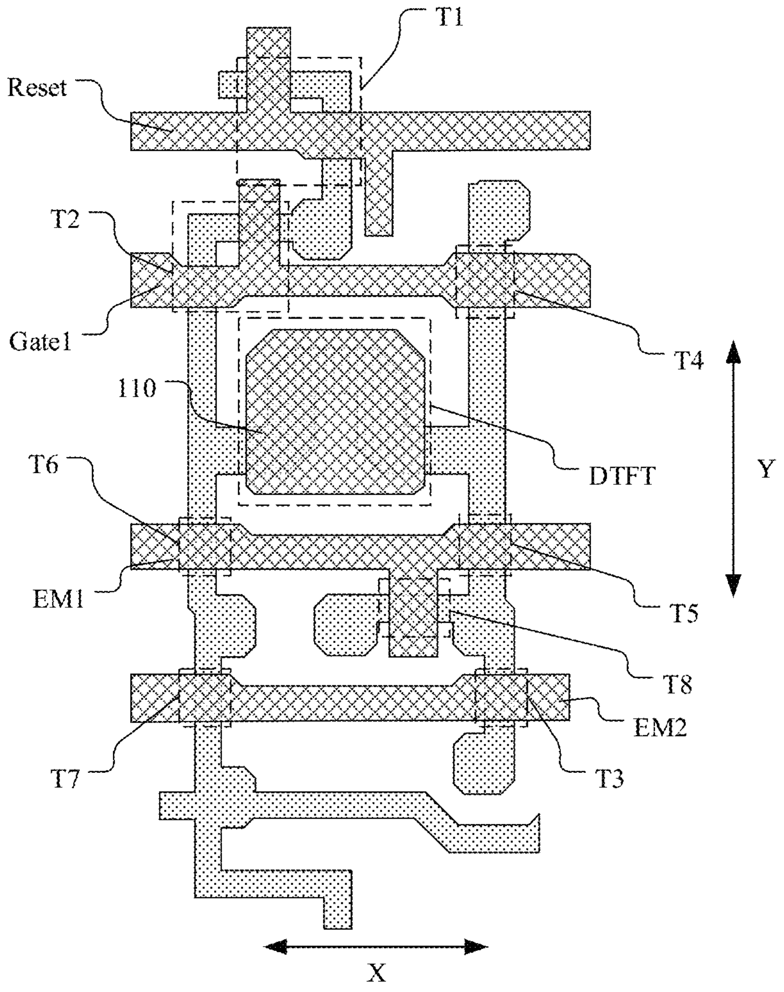
FIG. 25 is a structural layout of the active layer and the first conductive layer in FIG. 19.
Figure 26:
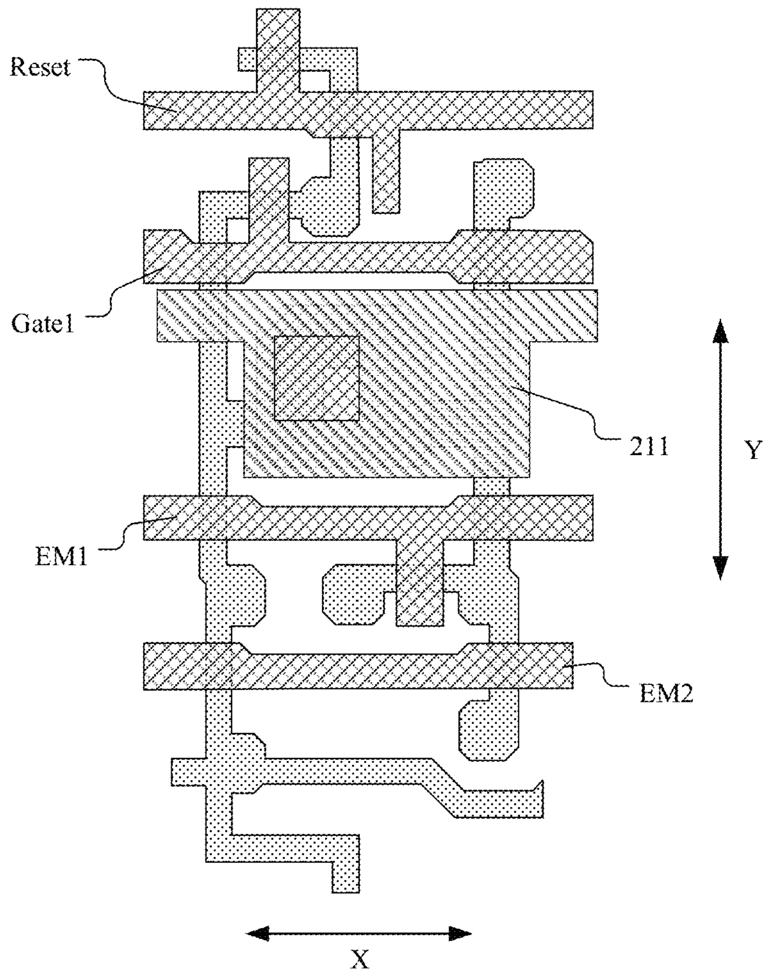
FIG. 26 is a structural layout of the active layer, the first conductive layer, and the second conductive layer in FIG. 19.
Figure 27:
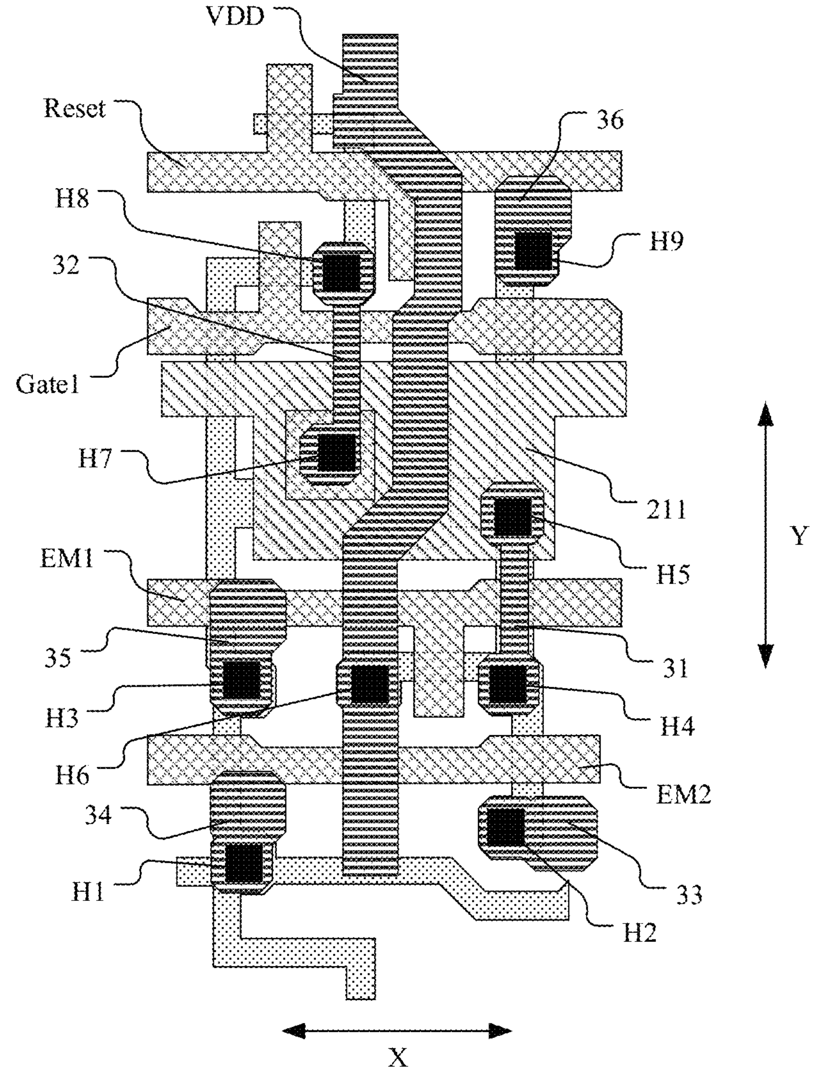
FIG. 27 is a structural layout of the active layer, the first conductive layer, the second conductive layer, and the third conductive layer in FIG. 19.
Figure 28:
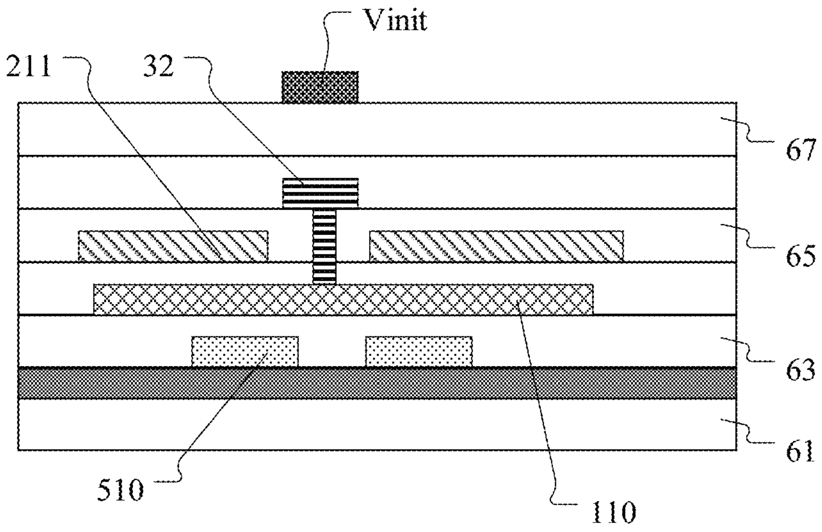
FIG. 28 is a partial cross-sectional view at the position of dotted line B in FIG. 19.

FIG. 24 is a structural layout of the fourth conductive layer in FIG. 19. FIG. 25 is a structural layout of the active layer and the first conductive layer in FIG. 19. FIG. 26 is a structural layout of the active layer, the first conductive layer, and the second conductive layer in FIG. 19. FIG. 27 is a structural layout of the active layer, the first conductive layer, the second conductive layer, and the third conductive layer in FIG. 19.

As shown in FIGS. 19, 20 and 25, the active layer may include a first active portion 51, a second active portion 52, a third active portion 53, a fourth active portion 54, a fifth active portion 55, a sixth active portion 56, a seventh active portion 57, an eighth active portion 58, a tenth active portion 510, an eleventh active portion 511, a twelfth active portion 512, a thirteenth active portion 513, a fourteenth active portion 514, a fifteenth active portion 515, and an active line 50. The first active portion 51 may include a first sub-active portion 5110 and a second sub-active portion 5120. The first sub-active portion 5110 and the second sub-active portion 5120 may be used to form two channel regions of the first transistor. The active layer may further include a third sub-active portion 5130 connected between the first sub-active portion 5110 and the second sub-active portion 5120. The second active portion 52 may include a fourth sub-active portion 521 and a fifth sub-active portion 522. The fourth sub-active portion 521 and the fifth sub-active portion 522 may be used to form two channel regions of the second transistor. The active layer may further include a sixth sub-active portion 523 connected between the fourth sub-active portion 521 and the fifth sub-active portion 522. The third active portion 53 is used to form the channel region of the third transistor T3. The fourth active portion 54 is used to form the channel region of the fourth transistor T4. The fifth active portion 55 is used to form the channel region of the fifth transistor T5. The sixth active portion 56 is used to form the channel region of the sixth transistor T6. The seventh active portion 57 is used to form the channel region of the seventh transistor T7. The eighth active portion 58 is used to form the channel region of the eighth transistor T8, The tenth active portion 510 is used to form the channel region of the driving transistor DTFT. The eleventh active portion 511 may be connected 58 to the third active portion 53, the fifth active portion 55, and the eighth active portion 58. The tenth active portion 510 may be connected to one end of the fifth active portion 55 away from the eleventh active portion 511. The twelfth active portion 512 is connected to one end of the eighth active portion 58 away from the eleventh active portion 511. The thirteenth active portion 513 is connected to one end of the third active portion 53 away from the eleventh active portion 511. The fifteenth active portion 515 is connected to one end of the seventh active portion 57 away from the sixth active portion 56. An orthographic projection of the active line 50 on the base substrate extends along the first direction X. The first direction X may be the row direction of the display panel. The active line 50 may be connected a plurality of fifteenth active portions arranged in the same pixel circuit row. The active layer may be formed of a polysilicon semiconductor, and the first to eighth transistors and the driving transistors may all be low temperature polysilicon transistors.

As shown in FIGS. 19, 21 and 25, the first conductive layer may include: a first enable signal line EM1, a second enable signal line EM2, a tenth conductive portion 110, an eighth conductive portion 18, a fifteenth conductive portion 115, a thirteenth conductive portion 113, a sixteenth conductive portion 116, a reset signal line Reset, and a first gate line Gate1. The first enable signal line EM1 is used to provide the first enable signal terminal. The second enable signal line EM2 is used to form the second enable signal terminal. The reset signal line Reset is used to provide the reset signal terminal. The first gate line Gate1 is used to provide the first gate driving signal terminal. An orthographic projection of the first enable signal line EM1 on the base substrate, an orthographic projection of the second enable signal line EM2 on the base substrate, an orthographic projection of the reset signal line Reset on the base substrate, and an orthographic projection of the first gate line Gate1 on the base substrate may all extend along the first direction X. The tenth conductive portion 110 is used to form the gate electrode of the driving transistor and the first electrode of the first capacitor. The orthographic projection of the first enable signal line EM1 on the base substrate covers the orthographic projection of the fifth active portion 55 on the base substrate. A partial structure of the first enable signal line EM1 is used to form the gate electrode of the fifth transistor T5. The orthographic projection of the second enable signal line EM2 on the base substrate may cover the orthographic projection of the third active portion 53 on the base substrate and the orthographic projection of the seventh active portion 57 on the base substrate. A partial structure of the second enable signal line EM2 may be used to form the gate electrode of the third transistor T3, and another partial structure of the second enable signal line EM2 may be used to form the gate electrode of the seventh transistor T7. The eighth conductive portion 18 may connected to the first enable signal line EM1. The orthographic projection of the eighth conductive portion 18 on the base substrate may cover the orthographic projection of the eighth active portion 58 on the base substrate. The eighth conductive portion 18 may be used to form the gate electrode of the eighth transistor T8. The thirteenth conductive portion 113 may be connected to a side of the reset signal line Reset facing the first gate line Gate1. The fifteenth conductive portion 115 may be connected to a side of the first gate line Gate1 facing the reset signal line. The sixteenth conductive portion 116 may be connected to a side of the reset signal line away from the first gate line Gate1. A partial structure of the first gate line Gate1 may be used to form the gate electrodes of the second transistor and the fourth transistor. The fifteenth conductive portion 115 may be used to form another gate electrode of the second transistor. A partial structure of the reset signal line Reset may be used to form the gate electrode of the first transistor. The sixteenth conductive portion 116 may be used to form another gate electrode of the first transistor. The display panel can use the first conductive layer as a mask to perform conductorization treatment on the active layer (a treatment to make at least a part of the active layer become a conductor), the area covered by the first conductive layer can form the channel regions of the transistors, and the area not covered by the first conductive layer can form a conductor structure.

As shown in FIGS. 19, 22 and 26, the second conductive layer may include an eleventh conductive portion 211. The eleventh conductive portion 211 may be provided with an opening 2111. An orthographic projection of the eleventh conductive portion 211 on the base substrate may at least partially overlap with the orthographic projection of the tenth conductive portion 110 on the base substrate. The eleventh conductive portion 211 may be used to form the second electrode of the first capacitor C1.

As shown in FIGS. 19, 23 and 27, the third conductive layer may include: a power supply line VDD, a first connection portion 31, a second connection portion 32, an interconnection portion 33, an interconnection portion 34, an interconnection portion 35, and an interconnection portion 36. The power supply line VDD is used to provide the first power supply terminal. An orthographic projection of the power supply line VDD on the base substrate may extend along the second direction Y, and the second direction may be the column direction of the display panel. As shown in FIG. 27, the power supply line VDD may be connected to the twelfth active portion 512 through a via hole H6 to connect the second electrode of the eighth transistor and the first power supply terminal. The first connection portion 31 can be connected to the eleventh active portion 511 through a via H4 and the eleventh conductive portion 211 through a via H5 to connect the second electrode of the third transistor and the second electrode of the first capacitor C1. The second connection portion 32 may be connected to the tenth conductive portion 110 through a via H7 and the fourteenth active portion 514 through a via H8 to connect the gate electrode of the driving transistor and the first electrode of the second transistor. An orthographic projection of the via H7 on the base substrate may be within the orthographic projection of the opening 2111 on the base substrate, so as to insulate the via H7 from the eleventh conductive portion 211. The interconnection portion 33 may be connected to the thirteenth active portion 513 through a via H2 to connect the first electrode of the third transistor. The interconnection portion 34 may be connected to the fifteenth active portion 515 through a via H1 to connect to the first electrode of the seventh transistor. The interconnection portion 35 may be connected to an active layer between the sixth active portion 56 and the seventh active portion 57 through a via H3 to connect the first electrode of the sixth transistor. The interconnection portion 36 may be connected to the active layer at one end of the fourth active portion 54 away from the fifth active portion 55 through a via H9 to connect to the first electrode of the fourth transistor. The orthographic projection of the power supply line VDD on the base substrate and the orthographic projection of the third sub-active portion 5130 on the base substrate may at least partially overlap, and the power supply line VDD may play a role of voltage stabilization on the third sub-active portion 5130. Therefore, abnormal leakage to the source and drain of the first transistor due to voltage fluctuation of the third sub-active portion 5130 is reduced.

As shown in FIGS. 19 and 24, the fourth conductive layer may include an initialization signal line Vinit, a data line Vdata, a reference voltage line Vref, an interconnection portion 41, and a seventeenth conductive portion 42. The initialization signal line Vinit may be used to provide an initialization signal terminal. The data line Vdata may be used to provide the data signal terminal. The reference voltage line Vref may be used to provide the reference voltage terminal. An orthographic projection of the initialization signal line Vinit on the base substrate, an orthographic projection of the data line Vdata on the base substrate, and an orthographic projection of the reference voltage line Vref on the base substrate can all extend along the second direction Y. As shown in FIG. 19, the initialization signal line Vinit may be connected to the interconnection portion 34 through a via H11 to connect the first electrode of the seventh transistor, and also the fifteenth active portion 515 may be connected to the first sub-active portion 5110 of a pixel driving circuit in a next row. Thus, the initialization signal line Vinit can also provide the initialization signal terminal to the first electrode of the first transistor in the pixel driving circuit of the next row. Similarly, the first electrode of the first transistor in the pixel driving circuit of the current row can be connected to an initialization signal line Vinit through the interconnection portion 34 in the pixel driving circuit of the previous row. Initialization signal lines Vinit can form a mesh structure with active lines 50, so that the resistance of the initialization signal lines Vinit themselves can be reduced. Each initialization signal line Vinit may include a first sub-initialization signal line Vinit1 and a second sub-initialization signal line Vinit2 that are connected with each. An orthographic projection of the first sub-initialization signal line Vinit1 on the base substrate and an orthographic projection of the second sub-initialization signal line Vinit2 on the base substrate may be staggered in the first direction. The orthographic projection of the first sub-initialization signal line Vinit1 on the base substrate may also at least partially overlap with the orthographic projection of the second connection portion 32 on the base substrate. The first sub-initialization signal line Vinit1 may play a role of voltage stabilization on the second connection portion 32, thereby reducing the voltage fluctuation of the gate electrode of the driving transistor during the light-emitting phase. The orthographic projection of the first sub-initialization signal line Vinit1 on the base substrate may also at least partially overlap with the orthographic projection of the fourteenth active portion 514 on the base substrate. The first sub-initialization signal line Vinit1 may play a role of voltage stabilization on the fourteenth active portion 514, thereby reducing voltage fluctuation of the gate electrode of the driving transistor during the light-emitting phase. The orthographic projection of the second sub-initialization signal line Vinit2 on the base substrate may at least partially overlap with the orthographic projection of the power supply line VDD on the base substrate. Such arrangement can reduce the shading effect of the second sub-initialization signal line Vinit2 on the display panel. The data line Vdata may be connected to the interconnection portion 36 through a via H13 to connect the first electrode of the fourth transistor and the data signal terminal. The reference voltage line Vref may be connected to the interconnection 33 through a via H10 to connect the reference voltage terminal and the first electrode of the third transistor. The interconnection portion 41 may be connected to the interconnection portion 35 through a via H12 to connect the first electrode of the sixth transistor. The interconnection portion 41 may be used to be connected with the first electrode of the light-emitting unit. The seventeenth conductive portion 42 may be connected to a side of the reference voltage line Vref away from the data line Vdata. An orthographic projection of the seventeenth conductive portion 42 on the base substrate may at least partially overlap with an orthographic projection of the sixth sub-active portion 523 in a right pixel driving circuit on the base substrate. The seventeenth conductive portion 42 may play a role of voltage stabilization on the sixth sub-active portion 523, thereby reducing abnormal leakage to the source and drain of the second transistor due to the voltage fluctuation of the sixth sub-active portion 523.

FIG. 18 is a partial cross-sectional view at the position of the dotted line B in FIG. 19. The display panel may further include a buffer layer 62, a first insulating layer 63, a second insulating layer 64, a dielectric layer 65, a passivation layer 66, and a planarization layer 67. The base substrate 61, the buffer layer 62, the active layer, the first insulating layer 63, the first conductive layer, the second insulating layer 64, the second conductive layer, the dielectric layer 65, the third conductive layer, the passivation layer 66, the planarization layer 67, and the fourth conductive layer can be stacked in sequence. The buffer layer 62 may include at least one of a silicon oxide layer and a silicon nitride layer. The first insulating layer 63 and the second insulating layer 64 may be silicon oxide layers. The dielectric layer may be a silicon nitride layer. The material of the passivation layer 66 may include an organic insulating material or an inorganic insulating material, for example, a silicon nitride material. The material of the planarization layer 67 may be an organic material such as an organic resin. The material of the first conductive layer and the second conductive layer can be one of molybdenum, aluminum, copper, titanium, and niobium or an alloy thereof, or a molybdenum/titanium alloy or a stack thereof or the like. The materials of the third conductive layer and the fourth conductive layer may include metal materials, such as one of molybdenum, aluminum, copper, titanium, and niobium, or an alloy thereof, or molybdenum/titanium alloy or a stack thereof, or may be a stack of titanium/aluminum/titanium. The base substrate 61 may include a glass substrate, a blocking layer, and a polyimide layer stacked in sequence, and the blocking layer may be an inorganic material.

Figure 29:
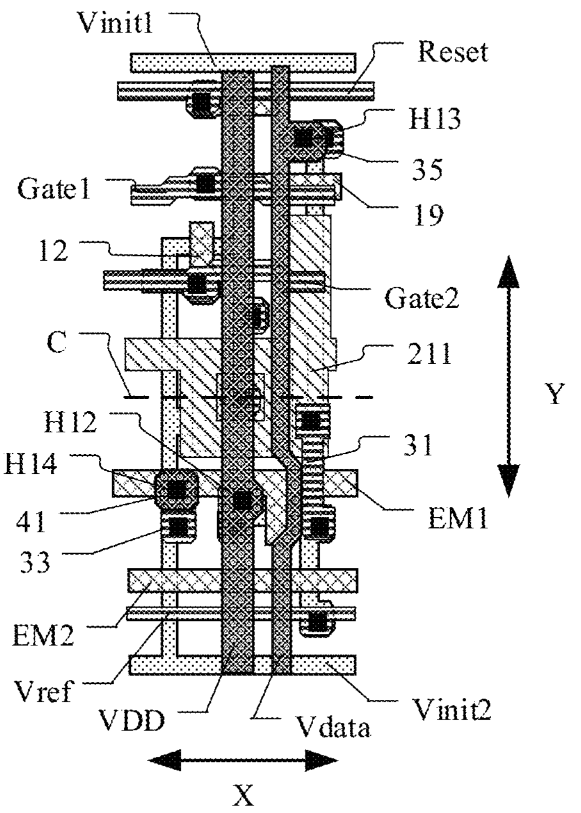
FIG. 29 is a structural layout of a display panel according to an example embodiment of the present disclosure.
Figure 30:
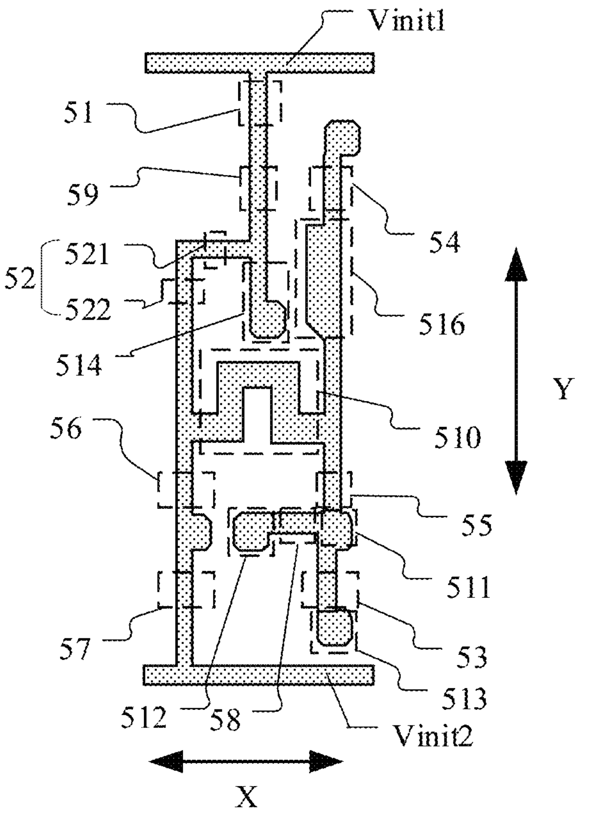
FIG. 30 is a structural layout of an active layer in FIG. 29.
Figure 31:
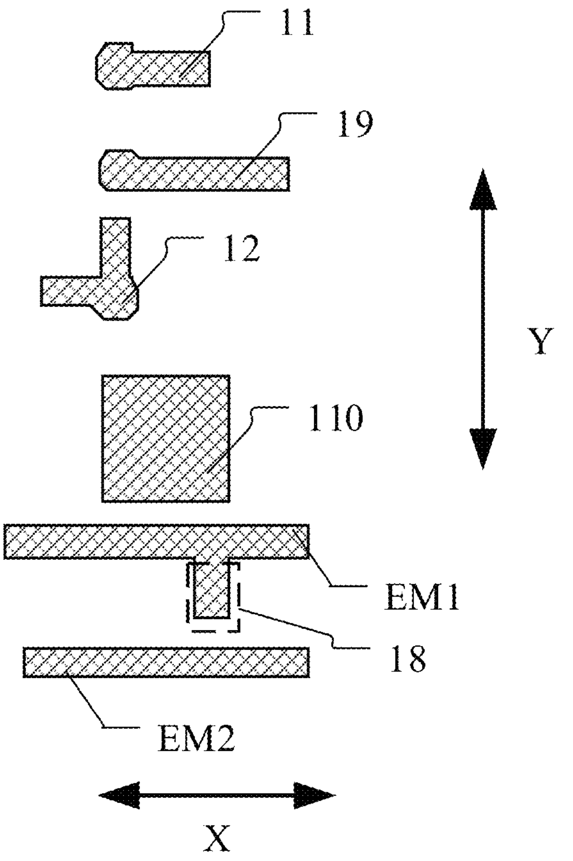
FIG. 31 is a structural layout of a first conductive layer in FIG. 29.
Figure 32:
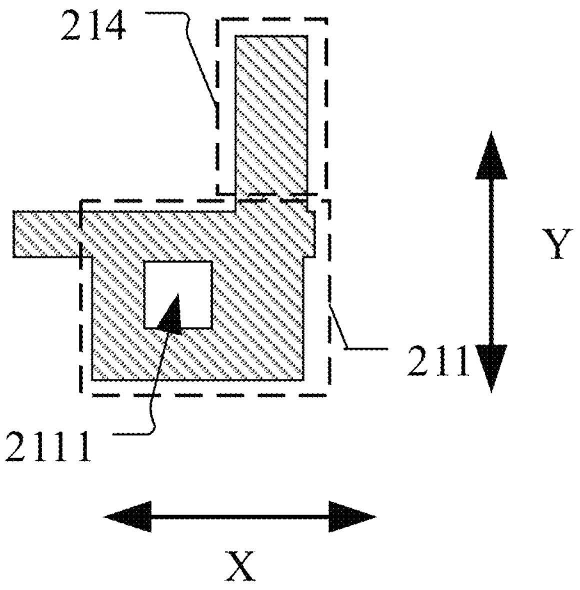
FIG. 32 is a structural layout of a second conductive layer in FIG. 29.
Figure 33:
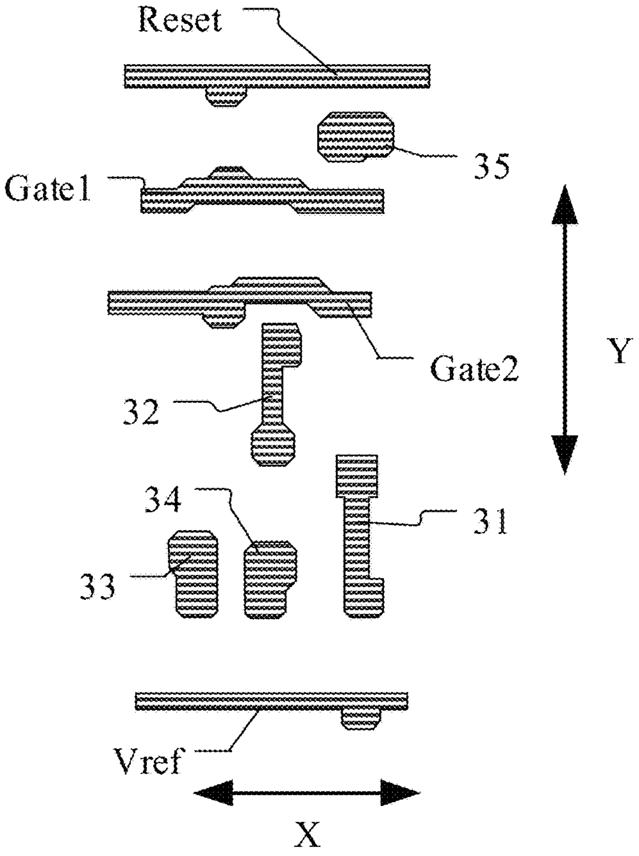
FIG. 33 is a structural layout of a third conductive layer in FIG. 29.
Figure 34:
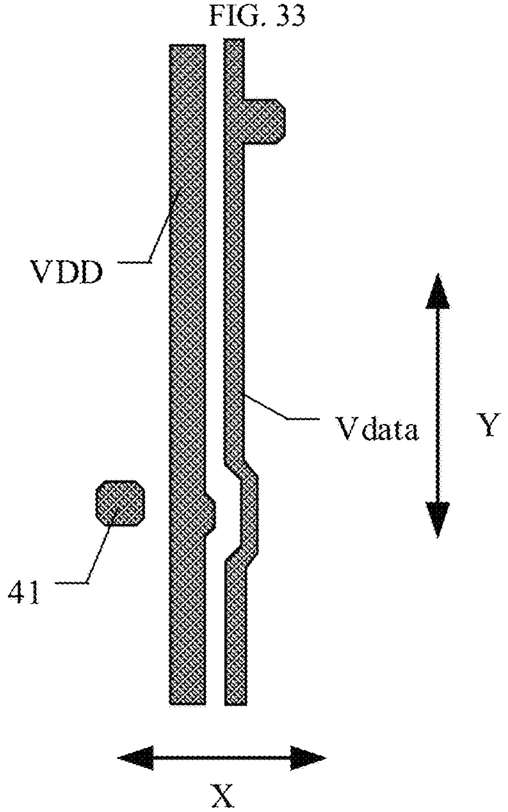
FIG. 34 is a structural layout of a fourth conductive layer in FIG. 29.
Figure 35:
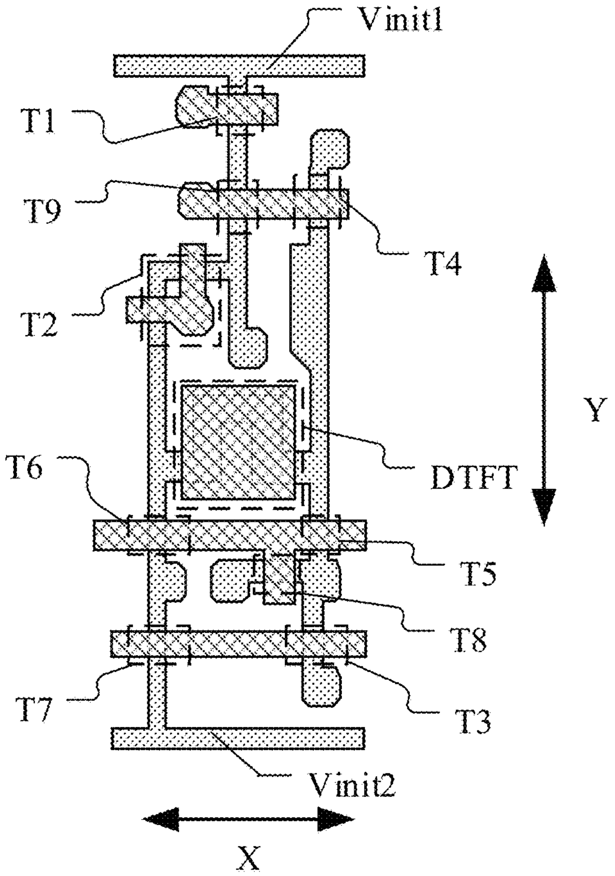
FIG. 35 is a structural layout of the active layer and the first conductive layer in FIG. 29.
Figure 36:
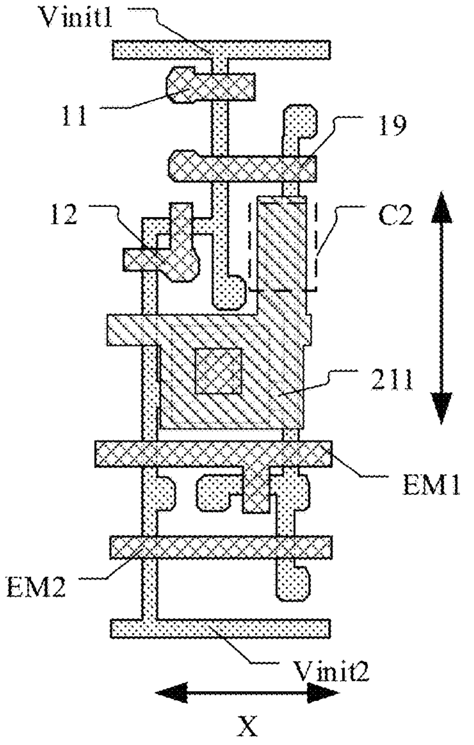
FIG. 36 is a structural layout of the active layer, the first conductive layer, and the second conductive layer in FIG. 29.
Figure 37:
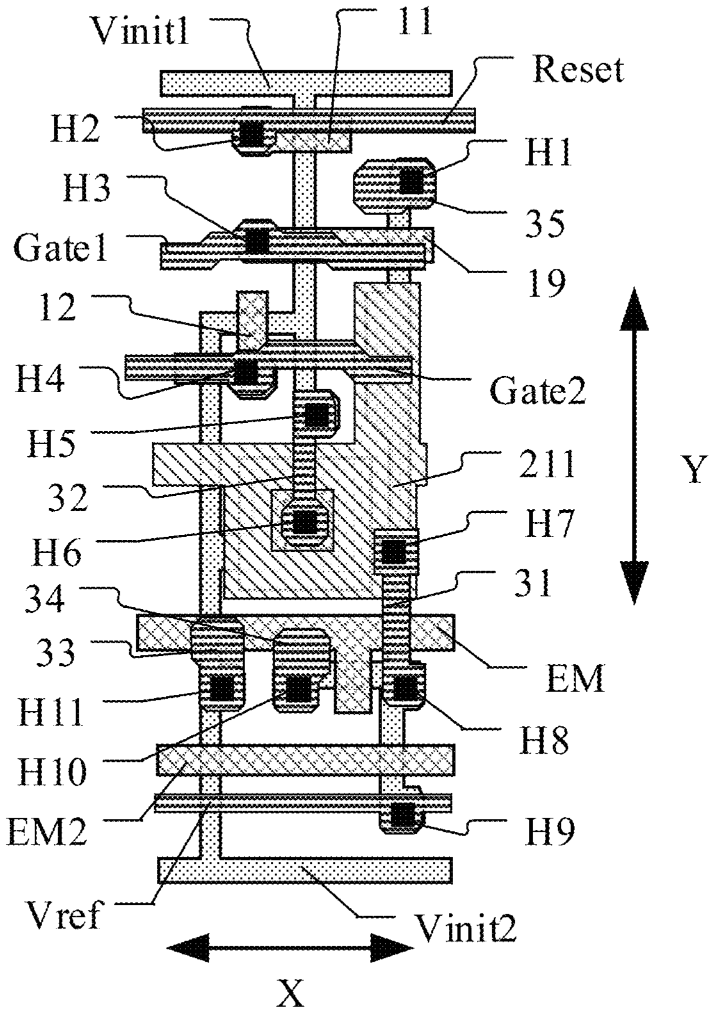
FIG. 37 is a structural layout of the active layer, the first conductive layer, the second conductive layer, and the third conductive layer in FIG. 29.

An example embodiment further provides another display panel, and the display panel may include a pixel driving circuit as shown in FIG. 7. The display panel may include a base substrate, an active layer, a first conductive layer, a second conductive layer, a third conductive layer, and a fourth conductive layer that are stacked in sequence, as shown in FIGS. 29-37. FIG. 29 is a structural layout of a display panel according to an example embodiment of the present disclosure. FIG. 30 is a structural layout of the active layer in FIG. 29. FIG. 31 is a structural layout of the first conductive layer in FIG. 29. FIG. 32 is a structural layout of the second conductive layer in FIG. 29. FIG. 33 is a structural layout of the third conductive layer in FIG. 29. FIG. 34 is a structural layout of the fourth conductive layer in FIG. 29. FIG. 35 is a structural layout of the active layer and the first conductive layer in FIG. 29. FIG. 36 is a structural layout of the active layer, the first conductive layer, and the second conductive layer in FIG. 29. FIG. 37 is a structural layout of the active layer, the first conductive layer, the second conductive layer, and the third conductive layer in FIG. 29.

As shown in FIGS. 29, 30 and 35, the active layer may include a first active portion 51, a second active portion 52, a third active portion 53, a fourth active portion 54, a fifth active portion 55, a sixth active portion 56, a seventh active portion 57, an eighth active portion 58, a ninth active portion 59, a tenth active portion 510, an eleventh active portion 511, a twelfth active portion 512, a thirteenth active portion 513, a fourteenth active portion 514, a sixteenth active portion, a first initialization signal line Vinit1, and a second initialization signal line Vinit2. The first active portion 51 may be used to form the channel region of the first transistor. The second active portion 52 may include a sub-active portion 521 and a sub-active portion 522. The sub-active portion 521 and the sub-active portion 522 may be used to form two channel regions of the second transistor. The third active portion 53 is used to form the channel region of the third transistor T3. The fourth active portion 54 is used to form the channel region of the fourth transistor T4. The fifth active portion 55 is used to form the channel region of the fifth transistor T5. The sixth active portion 56 is used to form the channel region of the sixth transistor T6. The seventh active portion 57 is used to form the channel region of the seventh transistor T7. The eighth active portion 58 is used to form the channel region of the eighth transistor T8. The ninth active portion 59 is used to form the channel region of the ninth transistor T9. The tenth active portion 510 is used to form the channel region of the driving transistor DTFT. The eleventh active portion 511 may be connected 58 to the third active portion 53, the fifth active portion 55, and the eighth active portion, and the tenth active portion 510 may be connected to an end of the first active portion 55 away from the eleventh active portion 511. The twelfth active portion 512 is connected to an end of the eighth active portion 58 away from the eleventh active portion 511. The thirteenth active portion 513 is connected to an end of the third active portion 53 away from the eleventh active portion 511. The fourteenth active portion 514 is connected to the second active portion 52 and the ninth active portion 59. The sixteenth active portion 516 is connected between the fourth active portion 54 and the tenth active portion 510. The sixteenth active portion 516 may be used to form the first electrode of the second capacitor. The size of the orthographic projection of the sixteenth active portion 516 on the base substrate in the first direction X may be larger than the size of an orthographic projection of the fourth active portion 54 on the base substrate in the first direction X. Both the orthographic projection of the first initialization signal line Vinit1 on the base substrate and the orthographic projection of the second initialization signal line Vinit2 on the base substrate may extend along the first direction X, which may be the row direction of the display panel. Two adjacent pixel driving circuits in the column direction may share one initialization signal line. For example, the first initialization signal line Vinit1 may further be used to provide an initialization signal terminal to the seventh transistor T7 in a pixel driving circuit of a previous row. The second initialization signal line Vinit2 may further be used to provide an initialization signal terminal to the first transistor T1 in a pixel driving circuit of a next row. The active layer may be formed of a polysilicon semiconductor, and the first to eighth transistors and the driving transistors may all be low temperature polysilicon transistors.

As shown in FIGS. 29, 31 and 35, the first conductive layer may include: a first enable signal line EM1, a second enable signal line EM2, a tenth conductive portion 110, an eighth conductive portion 18, a plurality of first conductive portions part 11, a plurality of ninth conductive portions 19, and a plurality of second conductive portions 12. An orthographic projection of the tenth conductive portion 110 on the base substrate covers an orthographic projection of the tenth active portion 510 on the base substrate, and the tenth conductive portion 110 is used to form the gate electrode of the driving transistor and the first electrode of the first capacitor. An orthographic projection of the first enable signal line EM1 on the base substrate may extend along the first direction X. An orthographic projection of the first enable signal line EM1 on the base substrate covers an orthographic projection of the fifth active portion 55 on the base substrate, and a partial structure of the first enable signal line EM1 is used to form the gate electrode of the fifth transistor T5. An orthographic projection of the second enable signal line EM2 on the base substrate may extend along the first direction X, and an orthographic projection of the second enable signal line EM2 on the base substrate covers an orthographic projection of the third active portion 53 on the base substrate and the orthographic projection of the seventh active portion 57 on the base substrate, and a partial structure of the second enable signal line EM2 may be used to form the gate electrode of the third transistor T3, and another partial structure of the second enable signal line EM2 may be used to form the gate electrode of the seventh transistor T7. The eighth conductive portion 18 may be connected to the first enable signal line EM1. An orthographic projection of the eighth conductive portion 18 on the base substrate may cover the orthographic projection of the eighth active portion 58 on the base substrate. The eighth conductive portion 18 is used to form the gate electrode of the eighth transistor T8. The first conductive portion 11 may be used to form the gate electrode of the first transistor. An orthographic projection of the ninth conductive portion 19 on the base substrate may cover an orthographic projection of the fourth active portion 54 on the base substrate and an orthographic projection of the ninth active portion 59 on the base substrate. The ninth conductive portion 19 may be used to form the gate electrode of the fourth transistor and the gate electrode of the ninth transistor. An orthographic projection of the second conductive portion 12 on the base substrate may cover the second active portion, and the second conductive portion 12 may be used to form the gate electrode of the second transistor. The display panel may use the first conductive layer as a mask to perform conductorization treatment on the active layer, the area covered by the first conductive layer can form the channel regions of the transistors, and the area not covered by the first conductive layer can form a conductor structure.

As shown in FIGS. 29, 32 and 36, the second conductive layer may include an eleventh conductive portion 211 and a fourteenth conductive portion 214. An orthographic projection of the eleventh conductive portion on the base substrate may at least partially overlap with an orthographic projection of the tenth conductive portion 110 on the base substrate. The eleventh conductive portion 211 may form the second electrode of the first capacitor C1. The fourteenth conductive portion 214 may be connected to the eleventh conductive portion 211. The orthographic projection of the fourteenth conductive portion 214 on the base substrate may at least partially overlap with the orthographic projection of the sixteenth active portion 516 on the base substrate. The fourteenth conductive portion 214 may be used to form the second electrode of the second capacitor C2. In addition, the eleventh conductive portion 211 is also provided with an opening 2111.

As shown in FIGS. 29, 33 and 37, the third conductive layer may include a reference voltage line Vref, a first gate line Gate1, a reset signal line Reset, a second gate line Gate2, a first connection portion 31, a second connection portion 32, an interconnection portion 33, an interconnection portion 34, and an interconnection portion 35. An orthographic projection of the reference voltage line Vref on the base substrate, an orthographic projection of the first gate line Gate1 on the base substrate, an orthographic projection of the reset signal line Reset on the base substrate, and an orthographic projection of the second gate line Gate2 on the base substrate may all extend along the first direction X. As shown in FIG. 37, the reset signal line Reset may be connected to the first conductive portion 11 through a via H2 to connect the reset signal terminal and the gate electrode of the first transistor. The same reset signal line Reset may be connected to the plurality of first conductive portions 11 in the same pixel circuit row. The first gate line Gate1 may be connected to the ninth conductive portion 19 through a via H3 to connect the first gate driving signal terminal with the gate electrode of the fourth transistor and the gate electrode of the ninth transistor. The same first gate line Gate1 may be connected to a plurality of ninth conductive portions 19 in the same pixel circuit row. The second gate line Gate2 may be connected to the second conductive portion 12 through a via H4 to connect the second gate driving signal terminal and the gate electrode of the second transistor. The same second gate line Gate2 may be connected to a plurality of second conductive portions 12 in the same pixel circuit row. The reference voltage line Vref may be connected to the thirteenth active portion 513 through a via H9 to connect the reference voltage terminal and the first electrode of the third transistor. The first connection portion 31 may be connected to the eleventh active portion 511 through a via H8 and the eleventh conductive portion 211 through a via H7 to connect the second electrode of the third transistor and the second electrode of the first capacitor C1. The second connection portion 32 may be connected to the tenth conductive portion 110 through a via H6 and the fourteenth active portion 514 through a via H5 to connect the first electrode of the second transistor and the gate electrode of the driving transistor. An orthographic projection of the via H6 on the base substrate is within the orthographic projection of the opening 2111 on the base substrate, and thus the via H6 is insulated from the eleventh conductive portion 211. The interconnection portion 33 may be connected to the active layer between the sixth active portion 56 and the seventh active portion 57 through a via H11 to connect the first electrode of the sixth transistor. The interconnection portion 34 may be connected to the twelfth active portion 512 through a via H10 to connect the second electrode of the eighth transistor. The interconnection portion 35 may be connected to the active layer of the fourth active portion 54 away from the tenth active portion 510 through the via H1 to connect the first electrode of the fourth transistor. A sheet resistance of the third conductive layer may be smaller than a sheet resistance of the first conductive layer. In this example embodiment, the reset signal line Reset, the first gate line Gate1, the second gate line Gate2, and the reference voltage line Vref are disposed at the third conductive layer, which can reduce the resistance of the above-mentioned signal lines themselves.

As shown in FIGS. 29 and 34, the fourth conductive layer may include: a data line Vdata, a power supply line VDD, and an interconnection portion 41. The data line Vdata may be used to provide the data signal terminal. The power supply line VDD may be used to provide the first power supply terminal. An orthographic projection of the data line Vdata on the base substrate and an orthographic projection of the power supply line VDD on the base substrate can both extend along the second direction Y, and the second direction Y may be the column direction of the display panel. As shown in FIG. 29, the power supply line VDD may be connected to the interconnection portion 34 through a via H12 to connect the second electrode of the eighth transistor and the first power supply terminal. The data line Vdata may be connected to the interconnection portion 35 through a via H13 to connect the first electrode of the fourth transistor and the data signal terminal. The interconnection portion 41 may be connected to the interconnection portion 33 through a via H14 to connect the first electrode of the sixth transistor. The interconnection portion 41 may be used to be connected to the first electrode of the light-emitting unit. As shown in FIG. 29, an orthographic projection of the power supply line VDD on the base substrate may at least partially overlap with the orthographic projection of the fourteenth active portion 514 on the base substrate, and the power supply line VDD can play a role of voltage stabilization on the gate electrode of the driving transistor, thereby reducing the voltage fluctuation of the gate electrode of the driving transistor during the light-emitting phase. The orthographic projection of the power supply line VDD on the base substrate may at least partially overlap with the orthographic projection of the second connection portion 32 on the base substrate. Similarly, the power supply line VDD can play a role of voltage stabilization on the gate electrode of the driving transistor to reduce the voltage fluctuation of the gate electrode of the driving transistor during the light-emitting phase.

Figure 38:
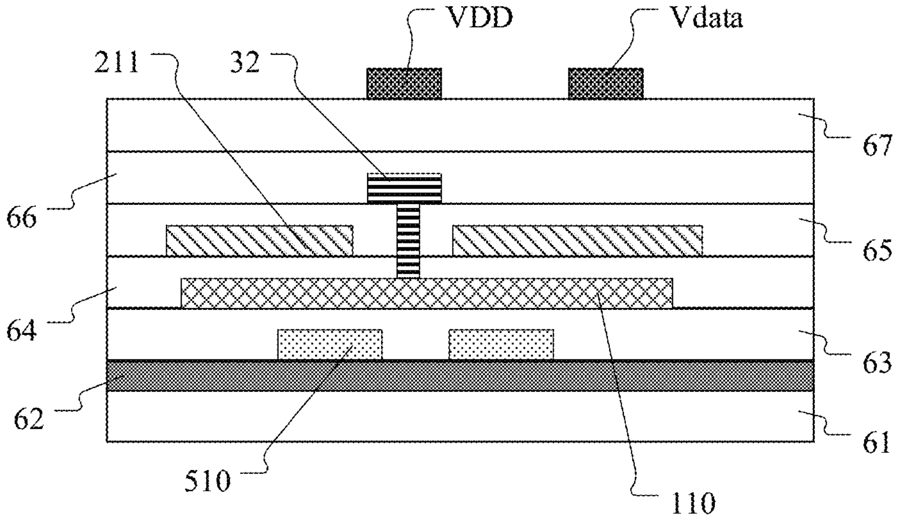
FIG. 38 is a partial cross-sectional view at the position of the dotted line C in FIG. 29.

FIG. 38 is a partial cross-sectional view at the position of the dotted line C in FIG. 29. The display panel may further include a buffer layer 62, a first insulating layer 63, a second insulating layer 64, a dielectric layer 65, a passivation layer 66, and a planarization layer 67. The base substrate 61, the buffer layer 62, the active layer, the first insulating layer 63, the first conductive layer, the second insulating layer 64, the second conductive layer, the dielectric layer 65, the third conductive layer, the passivation layer 66, the planarization layer 67, and the fourth conductive layer can be stacked in sequence. The buffer layer 62 may include at least one of a silicon oxide layer and a silicon nitride layer. The first insulating layer 63 and the second insulating layer 64 may be silicon oxide layers. The dielectric layer may be a silicon nitride layer. The material of the passivation layer 66 may include an organic insulating material or an inorganic insulating material, for example, a silicon nitride material. The material of the planarization layer 67 may be an organic material such as an organic resin. The material of the first conductive layer and the second conductive layer can be one of molybdenum, aluminum, copper, titanium, and niobium or an alloy thereof, or a molybdenum/titanium alloy or a stack thereof or the like. The materials of the third conductive layer and the fourth conductive layer may include metal materials, such as one of molybdenum, aluminum, copper, titanium, and niobium, or an alloy thereof, or molybdenum/titanium alloy or a stack thereof, or may be a stack of titanium/aluminum/titanium. The base substrate 61 may include a glass substrate, a blocking layer, and a polyimide layer stacked in sequence, and the blocking layer may be an inorganic material.

Other embodiments of the present disclosure will readily occur to those skilled in the art upon consideration of the specification and practice of the technical solutions disclosed herein. The present disclosure is intended to cover any variations, uses, or adaptations that follow the general principles of the present disclosure and include common general knowledge or techniques in the technical field not disclosed by the present disclosure. The description and examples are to be regarded as exemplary only, and the true scope and spirit of the present disclosure are defined by the appended claims.

It is to be understood that the present disclosure is not limited to the precise structures described above and illustrated in the accompanying drawings, and that various modifications and changes may be made without departing from the scope thereof. The scope of the present disclosure is defined only by the appended claims.

What is claimed is:

1. A display panel, comprising:

a base substrate; and an active layer arranged on a side of the base substrate, wherein the active layer comprises: a sixth active portion, a seventh active portion, a tenth active portion and a second initialization signal line, the second initialization signal line is connected to an end of the seventh active portion away from the sixth active portion, the second initialization signal line is used for providing an initialization signal to a seventh transistor, the seventh transistor comprises the seventh active portion, and the second initialization signal line extends along a first direction;

wherein the active layer further comprises a first initialization signal line, the first initialization signal line is connected to a first electrode of a first transistor, and the first initialization signal line extends along the first direction;

wherein the active layer further comprises:

an eighth active portion used for forming a channel region of an eighth transistor;

an eleventh active portion;

a third active portion used for forming a channel region of a third transistor;

a twelfth active portion connected to an end of the eighth active portion away from the eleventh active portion;

a thirteenth active portion connected to an end of the third active portion away from the eleventh active portion;

wherein the display panel further comprises a third conductive layer, and the third conductive layer comprises a reference voltage line, an orthographic projection of the reference voltage line on the base substrate extends along the first direction, and the reference voltage line is connected to the thirteenth active portion through a via;

wherein the display panel further comprises a fourth conductive layer arranged on a side of the third conductive layer away from the base substrate, the fourth conductive layer comprises a power supply line, an orthographic projection of the power supply line on the base substrate extends along a second direction, the first direction and the second direction intersect with each other, and the power supply line is connected to the twelfth active portion through a via.

2. The display panel according to claim 1, wherein the active layer further comprises a second active portion, the second active portion comprises two sub-active portions, the two sub-active portions are used for forming a second transistor, a terminal of the second transistor is connected to a gate electrode of a driving transistor, and another terminal of the second transistor is connected to a drain electrode of the driving transistor.

3. The display panel according to claim 2, wherein the two sub-active portions of the second active portion are used for forming two channel regions of the second transistor.

4. The display panel according to claim 1, wherein the display panel comprises a plurality of pixel driving circuits and each of the plurality of pixel driving circuits comprises a second transistor and a fourth transistor;

wherein a first electrode of the second transistor is connected to a gate electrode of a driving transistor, a second electrode of the second transistor is connected to a second electrode of the driving transistor, and a gate electrode of the second transistor is connected to a first gate line;

wherein a first electrode of the fourth transistor is connected to a data line, a second electrode of the fourth transistor is connected to the first electrode of the driving transistor, and a gate electrode of the fourth transistor is connected to the first gate line;

wherein the plurality of the pixel driving circuits comprise a first pixel driving circuit and a second pixel driving circuits which are apart in the first direction;

wherein the display panel further comprises a first conductive layer, and the first conductive layer comprises a plurality of fourth conductive portions, a partial structure of one of the fourth conductive portions is used to form a gate electrode of a second transistor in the first pixel driving circuit, and another partial structure of the one of the fourth conductive portions is used to form a gate electrode of a fourth transistor in the second pixel driving circuit;

wherein orthographic projections of the plurality of the fourth conductive portions on the base substrate are apart in the first direction;

wherein the third conductive layer further comprises the first gate line, an orthographic projection of the first gate line on the base substrate extends along the first direction, and the first gate line is connected to the plurality of fourth conductive portions which are apart in the first direction;

wherein a sheet resistance of the third conductive layer is smaller than a sheet resistance of the first conductive layer.

5. The display panel according to claim 4, wherein the third conductive layer further comprises a reset signal line, an orthographic projection of the reset signal line on the base substrate extends along the first direction, and the reset signal line is used for providing a reset signal terminal.

6. The display panel according to claim 1, wherein the display panel comprises a pixel driving circuit which comprises a fourth transistor, a first electrode of the fourth transistor is connected to a data line, and a second electrode of the fourth transistor is connected to a first electrode of a driving transistor;

wherein the display panel further comprises a first conductive layer and a second conductive layer, the first conductive layer comprises a tenth conductive portion, and the second conductive layer comprises an eleventh conductive portion;

wherein the active layer further comprises a fourteenth active portion connected to the tenth conductive portion;

wherein the second conductive layer further comprises a twelfth conductive portion connected to the eleventh conductive portion, an orthographic projection of the twelfth conductive portion on the base substrate extends along the second direction, and the orthographic projection of the twelfth conductive portion on the base substrate is at least partially between the orthographic projection of the fourteenth active portion on the base substrate and an orthographic projection of the data line on the base substrate.

7. The display panel according to claim 6, wherein the display panel further comprises a fourth conductive layer, the fourth conductive layer comprises a power supply line, the power supply line is used for providing a first power supply terminal, and an orthographic projection of the power supply line on the base substrate extends along the second direction;

wherein the orthographic projection of the power supply line on the base substrate at least partially overlaps with an orthographic projection of the fourteen active portion on the base substrate.

8. The display panel according to claim 7, wherein the twelfth conductive portion is connected to the power supply line.

9. The display panel according to claim 6, wherein orthographic projection of the twelfth conductive portion on the base substrate is located between orthographic projections of two adjacent fourth conductive portions in the first direction on the base substrate, the fourth conductive portions are arranged in the first conductive layer, a partial structure of one of the fourth conductive portions is used for forming a gate electrode of a second transistor in a first pixel driving circuit, and another partial structure of the one of the fourth conductive portions is used for forming a gate electrode of a fourth transistor in a second pixel driving circuit.

* * * * *